United States Patent
Mann

(10) Patent No.: US 7,962,659 B2
(45) Date of Patent: Jun. 14, 2011

(54) INTEROPERABLY CONFIGURABLE HMI SYSTEM AND METHOD

(75) Inventor: Joseph Francis Mann, Waukesha, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 802 days.

(21) Appl. No.: 11/529,816

(22) Filed: Sep. 29, 2006

(65) Prior Publication Data
US 2008/0189536 A1    Aug. 7, 2008

(51) Int. Cl.
*G06F 13/10* (2006.01)
(52) U.S. Cl. .................................. 710/8; 710/2; 710/12
(58) Field of Classification Search ........................ 710/8
See application file for complete search history.

(56) References Cited

U.S. PATENT DOCUMENTS

| | | | | |
|---|---|---|---|---|
| 6,167,464 A * | 12/2000 | Kretschmann | ................... | 710/15 |
| 6,381,502 B1 * | 4/2002 | Rudder et al. | .................... | 700/2 |
| 6,668,280 B1 * | 12/2003 | Okamoto et al. | ............. | 709/220 |
| 6,795,871 B2 * | 9/2004 | Nolan et al. | ....................... | 710/8 |
| 7,043,310 B2 * | 5/2006 | Polz et al. | ........................ | 700/66 |
| 7,272,458 B2 * | 9/2007 | Tomita | ............................. | 700/87 |
| 7,305,114 B2 * | 12/2007 | Wolff et al. | .................... | 382/141 |
| 7,426,590 B2 * | 9/2008 | Amrhein et al. | ................. | 710/62 |
| 7,599,999 B1 * | 10/2009 | Armstrong et al. | ........... | 709/216 |
| 7,602,128 B2 * | 10/2009 | Kling et al. | ....................... | 318/66 |
| 7,644,295 B1 * | 1/2010 | Dotson et al. | .................. | 713/340 |
| 7,668,605 B2 * | 2/2010 | Braun et al. | ..................... | 700/17 |
| 7,729,886 B2 * | 6/2010 | Sherrill et al. | ................. | 702/188 |
| 2001/0053947 A1 * | 12/2001 | Lenz et al. | ..................... | 700/117 |
| 2002/0046221 A1 * | 4/2002 | Wallace et al. | ............... | 707/513 |
| 2004/0186860 A1 * | 9/2004 | Lee et al. | ....................... | 707/200 |

* cited by examiner

*Primary Examiner* — Cheng-Yuan Tseng
(74) *Attorney, Agent, or Firm* — Fletcher Yoder LLP; Alexander R. Kuszewski; John M. Miller

(57) ABSTRACT

A configurable HMI is coupled to a configuration station and to one or more networked components, such as an industrial controller. Connections may be established with the networked component, such as to read from or write to registers within the component. A list of available connections or registers is accessed from the component by the HMI. The HMI then tabulates or otherwise presents the information in a listing to the configuration station. The configuration station may then be used to select a connection from the listing to alter programming of the HMI to establish the connection.

10 Claims, 17 Drawing Sheets

| Name | Address |
|------|---------|
| Pumpstart 1 | Register 1 |
| Drainopen | Register 15 |
| DrainClosed | Register 16 |
| ⋮ | ⋮ |

330, 332, 334

INTEROPERABLY CONFIGURABLE HMI SYSTEM AND METHOD

BACKGROUND

The present invention relates generally to the programming or configuration of human machine interfaces. More particularly, the invention relates to a technique for accessing information from a controller or other device by an interface and providing the information to a configuration station for programming of the interface.

A wide range of applications exist in industry, and in many other settings for human machine interfaces. A human machine interface (HMI) is generally an electronic device that allows a user to view the status of a machine or process. Certain interfaces may allow the user also to interact with the process by inputting information, commands, values and ranges, and so forth. Many improvements have been made in HMI's over the past years, particularly enhancing their functionality in terms of access to and reporting of information. Other advances have been made in the interoperability of HMI's with other components, particularly control systems.

One difficulty in programming configurable HMI's is in establishing reliable connections between the HMI's and other components. Such connections, in the present context, consist of addresses from which data can be acquired, and addresses to which data can be written. In general, an HMI may be interfaced, either directly or via a network, with various types of controllers, sensors, actuators, remote control systems, and so forth. Such other devices may contain memory registers from which data can be read, and to which data can be written during operation of the HMI. This interoperability is extremely important insomuch as it enables the HMI to perform complex reporting and calculation functions, both to a user of viewing a screen on the HMI, and to remote users and even control devices based upon accessed and computed information from the HMI.

Typical configuration of an HMI in the past, to establish such connections has relied upon prior knowledge of specific register addresses in interconnected components. Very little has been done to facilitate this process, although certain components, such as industrial controllers, may have the ability to list registers when accessed by remote equipment. Configuration of HMI's, however, has not been facilitated by improvements in connection configuration when coupled to controllers or other remote components. There is a need, therefore, for improved techniques and HMI's that facilitate such configuration. There is a particular need for a new approach to configuration that would allow HMI's to be rapidly and accurately configured based upon information already stored in networked components, such as industrial controllers.

BRIEF DESCRIPTION

The present invention provides an HMI configuration technique designed to respond to such needs. The technique may be employed in a wide range of settings, but is particularly well-suited to HMI's that are equipped for configuration via a configuration station which displays information served by the HMI itself. The served information may include a design environment in which enumerated objects stored on the HMI can have their properties altered through selections made on the configuration station. The invention may be used in other context, however, and is not limited to industrial settings.

In accordance with certain aspects of the present technique, a configurable HMI is coupled to one or more controllers or other networked components. The HMI is also coupled to a configuration station. The HMI accesses information in the controller or component indicative of connections or registers from which information can be read, and to which information can be written. The HMI then compiles a list of the available connections, and serves this list to the configuration station. An operator, interfacing with the HMI at the configuration station, may then program the HMI by establishing connections selected from the list. These connections may be used to alter properties of software objects within the HMI, thereby allowing for accurate configuration of the HMI based upon information actually acquired from the component to which the connection will be made.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
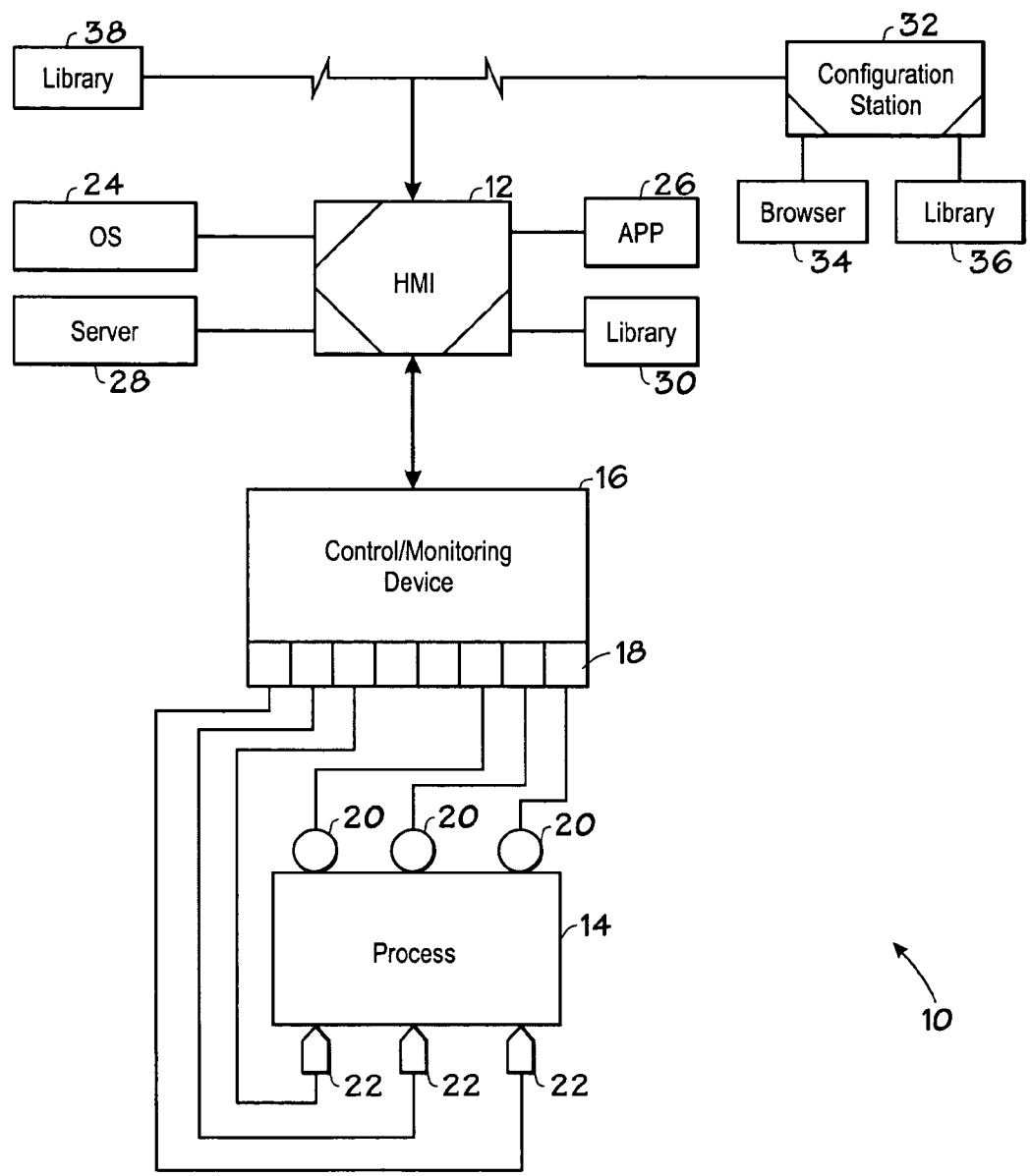
FIG. 1 is a diagrammatical overview of an exemplary implementation of an interface for monitoring or controlling a process.

Turning now to the drawings, and referring first to FIG. 1, an exemplary control and monitoring system 10 is shown diagrammatically, such as for industrial automation. The system includes human machine interface (HMI) adapted to interface with networked components and configuration equipment. The system 10 is illustrated as including an HMI 12 adapted to collaborate with components of a process or machine 14 through a control/monitoring device 16 (e.g., a remote computer, programmable logic controller, or other controller). The HMI 12 may physically resemble existing hardware, such as a panel, monitor or stand-alone device.

Collaboration between the HMI 12 and components of the process 14 may be facilitated by the use of any suitable network strategies. Indeed, an industry standard network may be employed, such as DeviceNet, to enable data transfer. Such networks permit the exchange of data in accordance with a predefined protocol, and may provide power for operation of networked elements. It should be noted that, while reference is made in the present discussion to networked systems and to systems incorporating controllers and other equipment, the HMI 12 and programming techniques described may be equally well applied to non-networked components (e.g., GPS displays, game displays, cell phone displays) and to networked systems outside the industrial automation field. For example, the arrangements and processes described below may be used in facilities management, automotive and vehicular interfaces, computer numeric control (CNC) machines, point of sale (POS) systems, control interfaces for commercial markets (e.g., elevators, entry systems), and so forth, to mention only a few.

As discussed more fully below, the invention facilitates programming and configuration of configurable interfaces, such as HMI's. In the present context, a "configurable interface" is any human interface device having embedded and dedicated code for accessing settings and displaying user-viewable views or screens based upon such settings. For example, such configurable interfaces may be used as operator interfaces for industrial equipment. The invention provides for accessing, configuring, and creating applications for utilization with such configurable interfaces by serving configuration screens to a browser or similar general purpose viewer.

As will be appreciated by those skilled in the art, such interfaces generally read data from and write to remote memory and particular registers, such as for interfacing with a process or machine. In other contexts, the interface simply accesses and displays data in a stand-alone architecture. For example, the innovations described below may be implemented in industrial computer terminals, equipment interfaces (e.g., programmable logic controllers and software interfaces), and related devices such as those used in industrial and commercial settings.

In general, a present embodiment of the invention may function as set forth in U.S. patent application Ser. No. 11/147,586, filed on Jun. 7, 2005 by Britt et al. and entitled Real Time Parallel Interface Configuration and Device Representation Method and System, which is hereby incorporated herein in its entirety. The system makes use of a run-time environment that includes or provides access to "device elements". The device elements are software components, typically "ActiveX" controls or ".NET" components that are managed by the run-time environment. "ActiveX" and ".NET" refer to object-oriented concepts, technologies and tools. Those skilled in the art will be well-acquainted with such programming approaches generally. In the present context, such standards should be taken as merely examples, and "device elements" should be understood as including any generally similar components or self-sufficient programs that can be run as quasi-independent elements, sometimes referred to as "objects". Other standards and platforms exist for such elements, typically championed by different companies or industry groups.

Because such device elements are basic to certain of the inventive concepts, a few words of introduction are in order. Device elements generally include four features: properties, methods, connections (or connection points) and communications interfaces. Properties are attributes that can be adjusted, such as to define an image or representation of the element in a screen view, as well as its location on the screen, and so forth. A method is an executable function (sometimes referred to herein as the elements "functionality" or "state engine"), and defines an operation performed by execution of the element. A connection is a link between elements, and can be used to cause data (read from a memory or written to a memory) to be sent to another element.

Specific examples of device elements may include software pushbuttons, timers, gauges, PLC communication servers, screens, and applications. In general, virtually any identifiable function may be configured as such an element. Moreover, as discussed below, such elements may communicate with one another to perform a wide range of display, monitoring operations and control functions. It should be noted that device elements do not require special limitations for supporting a design mode. Also, while elements associated with an image are quite useful, particularly for screen views, many elements may not have a visual representation, but may perform functions within an HMI, such as calculations, or even management and data exchange between other elements.

The run-time environment typically operates using a communications subsystem. The communications subsystem is adapted to interconnect the device elements. In practice, the communications subsystem may be thought of as including the connections of the device elements. However, it may include a range of software, hardware and firmware that send data to and receive data from external circuits, such as PLC's, other computers, networks, satellites, sensors, actuators, and so forth.

The run-time environment typically operates using a behavioral subsystem, which is adapted to manage the behavior of the device elements. For example, responsibilities of the behavioral subsystem may include the following: place and move device elements, modify device elements, group device elements on interchangeable screens, save and restore screen layouts, manage security, save and restore connection lists, and supply remote access to the run-time environment. Here again, in practice, such behaviors may be defined as part of the profile (i.e., the "method" or "state engine") of each device element.

In current embodiments, a design-time environment may be a product of combining Dynamic Hypertext Markup Language (DHTML) and an Active Server Page (ASP) server scripting to serve dynamic content to a browser. An ASP script is specially written code that includes one or more scripts (i.e., small embedded programs) that are processed on a server (e.g., Web server) before the page is sent to a user. Typically, in conventional usage, such script prompts a server to access data from a database and to make a change in the database. Next, the script typically builds or customizes the page before sending it to the requestor. As discussed below, such scripting is used in the present framework quite differently, such as to build screen views without prior knowledge of either the functionality of device elements, or their inter-relationships.

By facilitating changes to device elements, the design-time environment allows the designer to make interchangeable design-time models or specialized implementations of the behavioral subsystem. A specific example of a design-time implementation of the behavioral subsystem includes a Web-based design-time environment, which extends access to a run-time environment on an HMI via a TCP/IP connection between the HMI and a remote device. The Web-based design-time environment facilitates management of the device elements without compromising run-time performance or security. In one specialized implementation the behavioral subsystem gives designers the ability to manipulate aspects of the run-time environment using a Web browser that is capable of accessing a related interface or HMI. As described in detail below this is achieved by using a combination of dynamic content, scripting, and configuration of the device element properties.

The run-time or operation environment constructed and managed by a corresponding behavioral subsystem, is stored on and resident in the HMI 12. For example, such a behavioral subsystem can be adapted to load an application configuration framework from a storage location, such as during initial manufacture or setup of the HMI. When loaded, the stored application framework may be adapted to create screens and locate user interface device elements (actually images or pictorial representations corresponding to the elements) in the screens. These applications, screens, and user interface elements are each types of device elements. As described below, the HMI 12 includes a stored application that dictates the layout and interaction of the device elements. The Web-based design-time environment, which is based on a run-time engine, is also loaded and resident on the HMI. The design-time environment may be adapted to handle advanced features (e.g., security management) for both design-time and run-time environments.

The HMI may be adapted to allow a user to interact with virtually any process. For example, the process may comprise a compressor station, an oil refinery, a batch operation for making food items, a mechanized assembly line, and so forth. Accordingly, the process 14 may comprise a variety of operational components, such as electric motors, valves, actuators, sensors, or a myriad of manufacturing, processing, material handling and other applications. Further, the process 14 may comprise control and monitoring equipment for regulating process variables through automation and/or observation. The illustrated process 14 comprises sensors 20 and actuators 22. The sensors 20 may comprise any number of devices adapted to provide information regarding process conditions. The actuators 22 may similarly include any number of devices adapted to perform a mechanical action in response to an input signal.

As illustrated, these sensors 20 and actuators 22 are in communication with the control/monitoring device 16 (e.g., a PLC) and may be assigned a particular address in the control/monitoring device 16 that is accessible by the HMI 12. The sensors 20 and actuators 22 may be in direct communication with the HMI 12. These devices may be utilized to operate process equipment. Indeed, they may be utilized within process loops that are monitored and controlled by the control/monitoring device 16 and/or the HMI 12. Such a process loop may be activated based on process inputs (e.g., input from a sensor 20) or direct operator input received through the HMI 12.

The server software on the interface permits viewing of the development environment, and direct reconfiguration of the interface (particularly of the device elements and their associated appearance and functionality) without the need for special viewing or configuration software. This benefit flows from the fact that the device elements and the design-time environment itself is resident in the HMI, and "served up" by the HMI to a browser or other general purpose viewer on the configuration station. In other words, necessary support for external computer workstations (e.g., laptop and desktop computers) may be reduced or eliminated. It should be noted that reference to a "browser" for viewing and modifying configuration of the interfaces is not limited to Web browsers or to any particular browser. References to a browser are intended to be exemplary. More generally, the term "browser" is utilized herein to reference software which includes any general purpose viewer.

The HMI 12, through the programming of the device elements as described below, may be thought of as including instructions for presenting one or more screen views, and device elements executed upon interaction with the HMI by reference to the screen views (e.g., pressing a button, touching a location of a screen, and the like). The screen views and device elements may be defined by any desired software or software package. For example, the screen views and device elements may be called by or executed by an operating system 24. The device elements, as discussed above, in accordance with present embodiments, are objects conforming to ".NET" or "ActiveX" standards. The operating system itself may be based upon any suitable platform, such as Window CE. As referenced herein, the device elements and tools support Web services or technology for transmitting data over networks (e.g., the Internet). These device elements thus follow a set of rules regarding information sharing and are adapted for use with various scripting and programming languages, as described below. Such device elements enable provision of interactive content to outside applications such as a LAN, WAN, an intranet, an extranet, or even the World Wide Web. Accordingly, the operating system 24 and the various device elements facilitate dynamic configuration of the HMI 12 through a browser by allowing configuration access (e.g., serving up) to the browser.

For example, such configuration access includes access for instantiation of device elements. In other words, new device elements can actually be created and implemented from the browser. Again, it should be noted that the browser does not require actual functional access. Indeed, in one embodiment, requests via the browser result in a "draw" sequence of operations based on data functionality and content of device elements in a container, thus allowing illustration of the device element representations and access to their configuration without actually serving up functional aspects. This allows for configuration via a remote workstation without necessitating technical support for the remote workstation. Such aspects are described in greater detail below.

In addition to the operating system and device elements as described above, the HMI 12 includes an application or application layer 26. The application, which may itself comprise a device element, facilitates access to and acquisition of information from the various device elements of the HMI. In particular, the application 26 represents a first level in a multi-level device element that can be enumerated for execution. The application 26 in a practical implementation may comprise a user application in the form of an XML page. The user application is then interacted with by the user or operator, as well as by the designer as described in greater detail below.

The screen views and device elements may be described as independent executable pieces of software. In a present implementation, the screen views are defined by appropriate code written in a markup language (e.g., Hypertext Markup Language or HTML). Thus, the configuration of graphical interface screens for the HMI 12 may be performed without the use of conversion programs. Further, by programming of the device elements, the screen views may be developed directly on the HMI 12 via resident server software (designated as server 28) that makes the resident development environment available for remote access. Specifically, in one embodiment, representations of certain device elements (e.g., ActiveX controls) are served up to the browser without serving up the software components themselves. Because a development or design-time environment may be accessed via a browser, the need to download changes to the screens and to update remote configuration software applications can be eliminated.

As noted above, device elements may include functionality by which they read from or write to specific memory or registers of memory, typically in other devices (but which could also be within the HMI). For example, a particular function may correspond to writing to or reading from a register 18 of control/monitoring device 16. In a simple case, for example, an object simply accesses a piece of data (e.g., a state of a component as determined by a sensor), and generates an output signal to write a value corresponding to the state of a different networked device. Much more complex functionality can, of course, be configured. In an industrial control and monitoring context, for example, such device elements may emulate operation of a range of physical components, such as a momentary contact push button, a push button with delayed output, a switch, and so forth. Many pre-programmed device elements may be available for use by the HMI 12. Such functional modules may be accessible via a network, or may be resident on the HMI 12, or resident on a separate device directly linked to the HMI 12. In this way, an HMI supplier or software supplier may provide many possible building blocks from which screens and complex control and monitoring functions may be programmed. Indeed, a library 30 of available device elements may reside on the HMI 12 to facilitate configuration of the HMI 12, as described below. The screen instructions may call upon the device elements for performing desired functions based upon operator inputs, and these instructions may be programmed into versions of the pre-programmed elements. For example, the operator may provide initiating inputs by touching a location on a touch screen or depressing keys on a keyboard. Based upon the screen instructions and the device elements associated with the instructions (e.g., with specific locations triggering calls or execution of pre-configured device elements) the desired functions may then be executed. Accordingly, the operator is enabled to interact with a process, typically to change screen views, write to registers, or command the generation of other output or control signals. In a stand-alone implementation, the interactions may simply recall or store data, change screens, and so forth.

One or more separate interface screens may be employed, with some HMI's having many such screens and a great number of device elements. Each device element may, in turn, be uniquely programmed to consider specific inputs, perform specific functions, and generate signals for specific outputs. A plurality of such device elements can be loaded and hosted in a single software "container" (e.g., ActiveX container).

The HMI may be configured by interacting directly with a panel or screen on the HMI itself (if one is present), but in many cases configuration will be performed from a remote configuration station 32. For example, access is provided directly to the resident library 30 and/or operating system 24 and application 26 via a browser 34 or similar application. In a present implementation, no other specialized software is required at the configuration station 32. Indeed, the server 28 resident on the HMI 12 may provide access to the device elements in library 30. By storing the device elements in library 30 directly on the HMI 12, the risk of version conflicts and so forth are eliminated or reduced. Additionally, the HMI may be directly connected to the configuration station, or accessed by reference to an IP address (Internet Protocol address) assigned to the HMI 12.

Access control schemes may be used to limit the ability to change screens and device elements. For example, a password or user access status may be required to gain such access. Further, in a presently contemplated embodiment, the configuration station automatically recognizes the HMI or the terminal on which the HMI is resident as a device upon being coupled to the configuration station (e.g., similar to an external memory or drive). Thus, once connected to the configuration station, the HMI may simply be "recognized" as a device that can be accessed (providing the configuration screen and tools described below).

Once the device elements then resident on the HMI 12 are accessible to the configuration station 32, aspects of the HMI 12 can be modified or updated directly on the HMI 12 via the communication link from the configuration station 32. For example, a user may wish to update a particular HMI graphic to provide data, such as historical data or trending relating to information being received from a newly installed sensor 20. Additionally, the user may find it desirable or convenient to update the HMI graphic for presentation of such data while in an off-line mode (e.g., without immediately implementing the changes). In such a scenario, the user may link to the library 30 of available device elements via the configuration station 32 and use them to modify the HMI graphic or functionality in a development environment.

It should be noted that additional device elements can be added to the library 30. For example, if a trending device element is not resident on the HMI 12, a user can download such an element to the HMI 12 from a configuration library 36 resident on the configuration station 32. Alternatively, a user could access the trending device element from a resource library 38 accessible via a network (e.g., the Internet), either directly to HMI 12 or through the configuration station 32. This may be particularly beneficial because new and improved device elements can be downloaded to the HMI 12 individually and on a periodic basis, thus adding new functionality without necessitating the periodic release of new conversion programs or HMI operating systems, or run-time or design-time environment software. The development environment may provide links to such libraries. Further, in embodiments using embedded code (e.g., operating system, server software, device objects, etc.), because the embedded code resides on the HMI 12, version conflicts with the embedded code may be avoided and the necessity for configuration station software upgrades may be eliminated.

Figure 2:
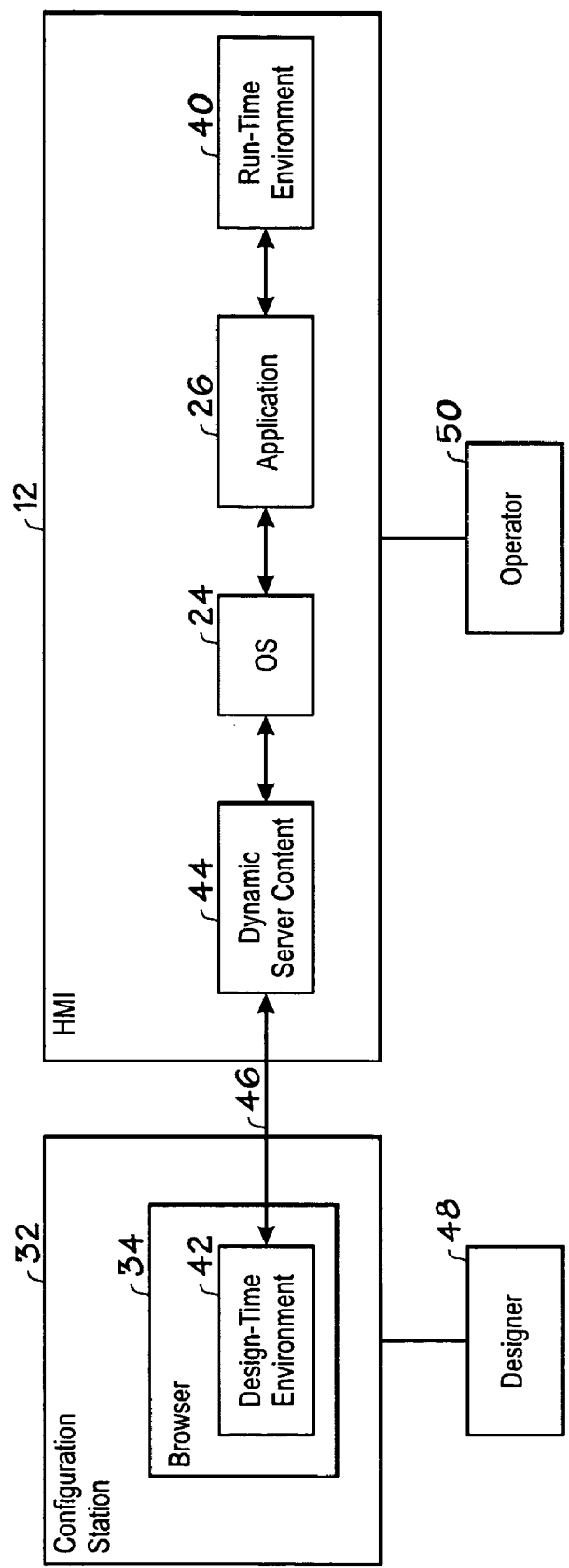
FIG. 2 is an overview of certain of the functional components in an interface and a configuration station in accordance with aspects of the present technique.

FIG. 2 is a flow diagram representing interaction between an HMI and a configuration station. In general, a platform for the HMI and configuration station will include the operating system or executive software 24, application software 26, as well as any communication software, a microprocessor, a network interface, input/output hardware, generic software libraries, database management, user interface software, and the like (not specifically represented in FIG. 2). In the illustrated embodiment, a design-time platform and a run-time platform interact within the HMI. The design-time platform provides views that are served as the design-time environment to a desktop personal computer platform (e.g., running a suitable operating system, such as Windows XP or RedHat Linux) and the run-time platform cooperates with the design-time platform via the operating system (e.g., Windows CE, Linux). The design-time platform provides dynamic server content 44, while the run-time platform displays views on the HMI itself (if a display screen is provided on the HMI). The design-time environment is displayed in a browser 34 (e.g., Web browser or other general purpose viewer).

FIG. 2 represents how the design-time environment interacts with the operating system 24, application 26 and the run-time environment. The arrow 46 represents a link for dynamic exchange of content between the HMI 12 and configuration station 32. In general, interaction with the design-time environment is the task of a designer 48 who initially configures the HMI screens or views, device elements, their functions and interactions, or who reconfigures such software. The run-time environment is generally interacted with by an operator 50 directly at the HMI. It should be noted that while the design-time environment has specific needs, in a current embodiment, it depends heavily on the operating system, application and run-time environment. The design-time environment and the run-time environment may utilize certain base technologies (e.g., DHTML, HTML, HTTP, dynamic server content, JavaScript, Web browser) to operate respectively in the design-time platform and run-time platform. While, in the illustrated embodiment, the run-time environment and the design-time environment reside on separate platforms, in some embodiments they may reside on the same platform. For example, the design-time platform and run-time platform may be configured as or considered a single platform.

In one embodiment of the present invention, a design-time Web implementation is utilized. This design-time Web implementation offers the speed and flexibility of software running on the design-time platform by using a Web browser (e.g., 34) with DHTML support from the HMI, as noted by the dynamic server content 44 in FIG. 2. DHTML is used to perform dynamic manipulation of Web content in the design-time environment. Further, the dynamic server content 44 is used in the HMI to serve dynamic Web content to the design-time environment. This dynamic client-server environment allows the Web browser to simulate an application running on the design-time platform without requiring a piece of software compiled for a related processor.

Figure 3:
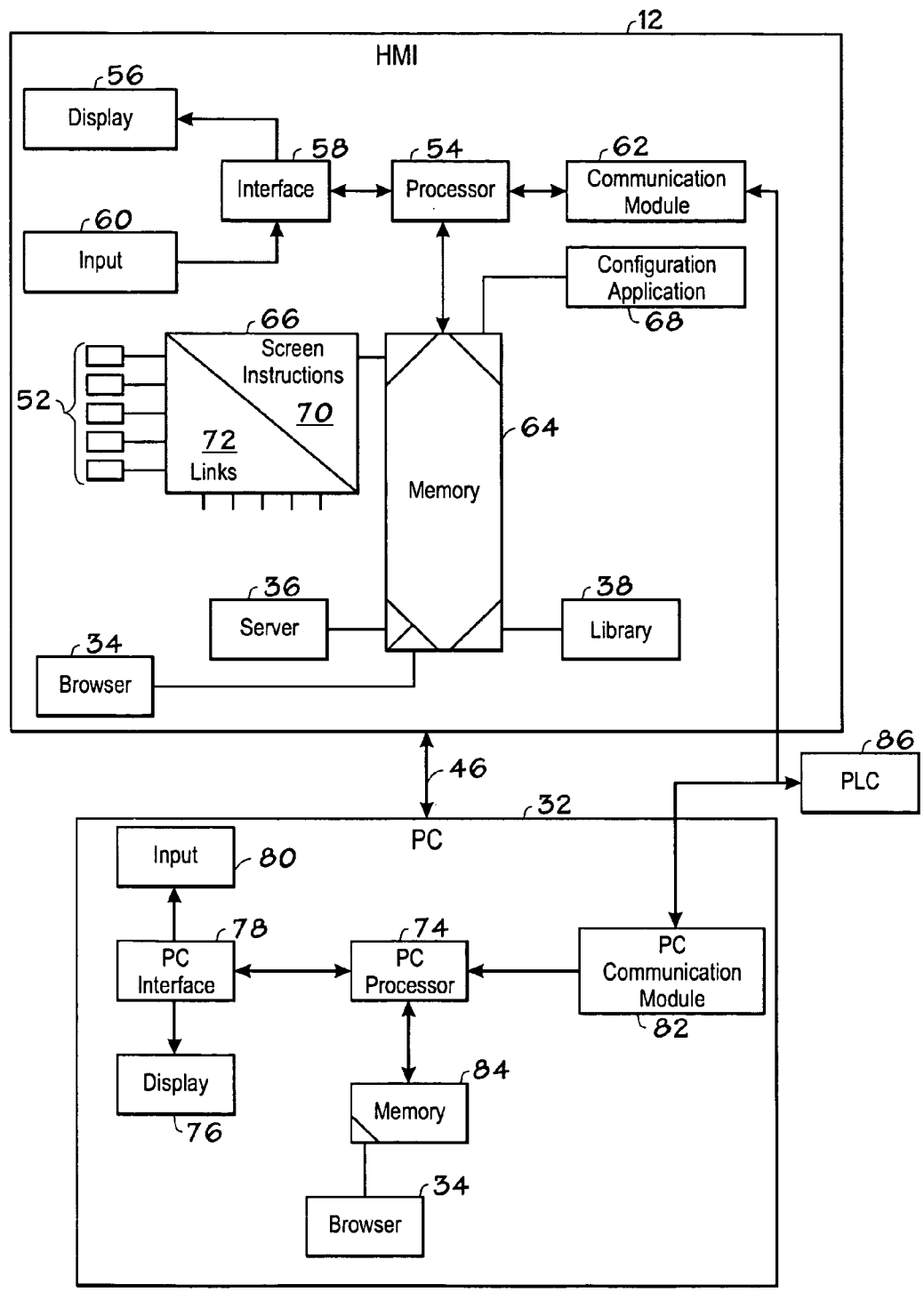
FIG. 3 is a diagrammatical overview of an interface and configuration station in somewhat greater detail, illustrating certain of the functional, hardware and software components.

FIG. 3 is a block diagram illustrating interaction among components of both an HMI and a configuration station in accordance with embodiments of the present techniques. Specifically, an HMI 12 that is in a communicative relationship with a general purpose computer (PC) 32 via data or content link 46. The data link 46 may comprise a direct cable link, a network link, a wireless link, or any interconnecting circuit between locations for the purpose of transmitting and receiving data. For example, the data link 46 may represent, in part, the Internet. Further, both the HMI 12 and the PC 32 are illustrated as comprising certain exemplary components that facilitate operation and communication in accordance with embodiments of the present techniques.

The HMI 12 may comprise a configurable tool built around an HMI microprocessor 54. The HMI 12 may be adapted to interface with an industrial hardware interface such as a programmable logic controller (PLC) 86. While the HMI 12 may comprise many different parts and components, certain exemplary components are presently illustrated to demonstrate aspects in accordance with embodiments of the present techniques. Specifically, in addition to the processor 54, the illustrated embodiment includes a display module 56 (e.g., a graphical component or physical display screen), a display/input interface module 58, an input module 60 (e.g., keypad or touch-screen), a communication module 62 (e.g., TCP/IP component), and memory 64. In accordance with the present techniques, the memory module 64 may store computer programs and components such as a markup language page 66 (e.g., HTML page), a control object library 30, and embedded code defining a configuration application 68.

The markup language page 66 may include any document created in a markup language that can be displayed. Multiple pages, such as page 66, may be stored in memory 64 for utilization in interfacing with a system or process. As discussed above, each such page will typically comprise screen instructions 70 and links 72 to pre-programmed functional modules or device elements. For example, the links 72 may cooperate with certain device elements 52 to facilitate display of system parameters and/or control of a related system or process. The HMI 12 may provide access to such pages and configuration of such pages using a server program 28 (e.g., an ASP server) stored in memory 64. Additionally, the HMI 12 or an external configuration station (e.g., PC 32) may utilize such pages by employing a standard browser program 34. In accordance with embodiments of the present techniques, software components related to the page 66 facilitate a configurable development environment. In one embodiment, the development environment itself is configurable. Accordingly, fixed components of the development environment (e.g., a banner) can be changed for aesthetic or functional purposes. For example, a customer purchasing an HMI in accordance with embodiments of the present technique can change a banner in the development environment to display a customer logo rather than a manufacturer logo. A user can make changes to the development environment in the same way changes are made to object properties.

The device elements 52 may comprise modular control strategies and graphical components that enable system configuration and operation. For example, the device elements 52 may include modules for configuring one or more field devices (e.g., inputs and outputs) and related control logic (e.g., expressions). Indeed, these device elements 52 may be adapted to provide reusable configurations for process equipment, sensors, actuators, control loops and so forth. As discussed above, in accordance with embodiments of the present techniques, available device elements may reside in a library stored on the memory module 64. Each device element 52 in accordance with present techniques may include a unique control tag, a data history, a display definition, and a control strategy (i.e. stat engine). Further, each device elements 52 may be a separate module, enabling operation, debugging, and transfer of individual elements 52 without affecting other elements. In many settings, and particularly in industrial automation contexts, "families" of such elements may be pre-defined, such as for various types of push buttons, trending modules, and so forth.

As discussed above, the application 68 may cooperate with separate server application 28 that is stored on the HMI to provide access to configuration of the HMI 12. Alternatively, the application 68 may itself comprise a server module to perform such a function. A user may remotely configure the HMI 12 from the PC 32 using a browser 34. The application 68 may comprise the configured device elements that configure the markup language page 66. For example, the application 68 may allow a user to configure the page 66 in a development environment for use as a graphical interface in the HMI 12. Once configured, the page 66 may be saved as a file, and implemented in an operation mode of the HMI 12, where the page 66 may be utilized as an operable graphical interface. Each device element 52 may be an independent executable piece of software that can communicate with other elements to perform complex functions.

The PC 32, much like the HMI 12, may comprise a general purpose tool built around a microprocessor 74. The illustrated PC 32 is adapted for interface with the HMI 12 through data link 46 to facilitate configuration of the HMI 12. While the PC 32 may comprise many different parts and components, certain exemplary components are presently illustrated to demonstrate aspects in accordance with embodiments of the present techniques. Specifically, in addition to the processor 74, the illustrated embodiment includes a display module 76 (e.g., a graphical component or physical display screen), a display/input interface module 78, an input module 80 (e.g., keyboard), a communication module 82 (e.g., TCP/IP component), and a memory 84. In accordance with the present techniques, the memory module 84 may store computer programs and components such as the browser application 34. In accordance with some embodiments, the browser application 34 may be adapted to display a markup language page, such as page 66. Indeed, the browser 34 may be the equivalent to the browser 34 of the HMI.

Figure 4:
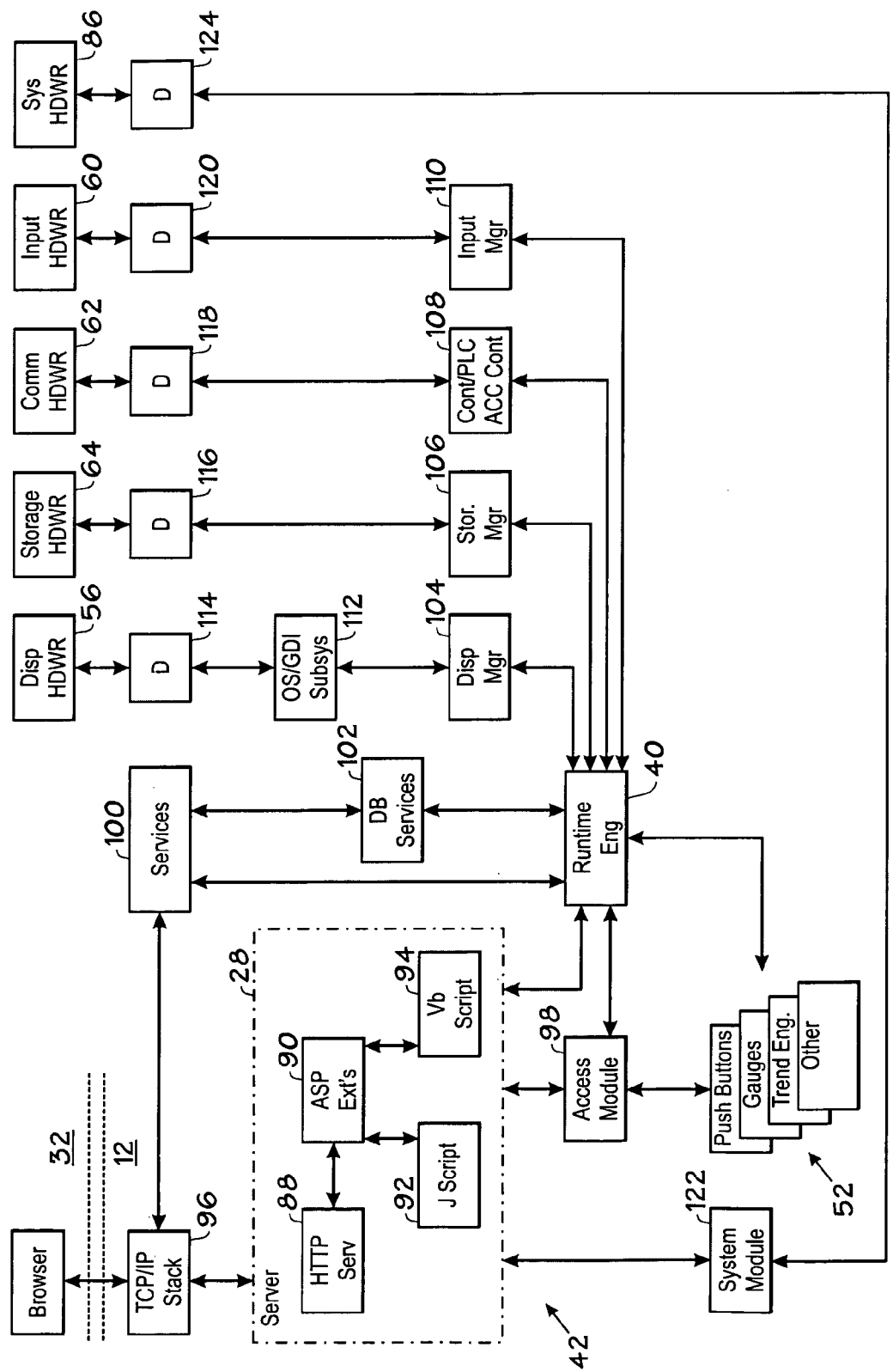
FIG. 4 is a detailed blocked diagram of certain device elements and components contained in an interface for facilitating configuration and use of the interface in accordance with aspects of the present technique.

FIG. 4 illustrates certain of the functional components contained in a present embodiment of an HMI 12 built upon the overall structures described above. In particular, FIG. 4 illustrates server software 28 contained generally in the design-time environment or engine 42. As described more fully below, the server software 28 permits dynamic content to be provided to a browser 32 that will be displayed in the configuration station. The server software 28 also facilitates interaction with the run-time environment or engine 40 and with the various device elements 52 configured within and stored within the HMI. Moreover, within the HMI is software, also described below, which facilitates interaction with display hardware 56 of the HMI itself, storage hardware or memory 64 of the HMI, communications hardware 62 of the HMI, input hardware 60 of the HMI, and generally with system components 86 which will be remote from but interconnected with the HMI.

The server software 28 generally includes an HTTP server component 88, an ASP extensions component 90, a Java script component 92 and a VB script component 94. As will be appreciated by those skilled in the art, in a present implementation, the HTML server service component 88 receives and transmits data by means of a TCP/IP stack 96 which is exchanged with the browser application contained within the configuration station. The HTTP server module 88 itself preprocesses portions of code received via the TCP/IP stack 96 based upon code extensions in the form of "ASP" extensions. While various other alternative scripting may be employed, and a present implementation ASP extensions are used to convey to module 90 that scripting functions are to be performed. The ASP extensions module 90, then, handles the ASP content as described below. Various alternatives to such ASP scripting might include Java service pages (.JSP scripting), CGI scripting, API scripting, and so forth. The Java script module 92 and the Vb script module 94 are provided as examples of interpreters for the server side scripting.

As will be appreciated by those skilled in the art, various existing approaches may used for scripting, including using ASP extensions. Such applications typically involve modifications to a database. That is, in order processing software and applications, such extensions may be used to alter order status, inventory levels, and so forth. In the present application, such extensions are used, and more generally such server side scripting is used entirely differently. Here the scripting is used to access device elements, enumerate such elements to determine their identifies and properties, compile views that can be provided to the designer, and perform all such functions without prior knowledge of the application or device elements themselves, and also without serving the actual code or device elements themselves. The server software 28 thus provides a highly flexible platform, particularly in conjunction with the access module 98 described below, that can be used with any underlying configuration or device elements to provide a simple and user-friendly design-time environment served to a general purpose browser.

Access module 98 is itself a device element. This module runs in the web services processing space (see, services module 100 in FIG. 4). In general, the access module 98 is called by the server module 28 to process code flagged by ASP extensions. The access module 98, then, accesses various device elements which are configured within the HMI as described more fully below. As illustrated in FIG. 4, such device elements may include push buttons, gauges, trend engines, and so forth. In a more general context, such device elements may include any graphical elements used for interacting with an HMI or any other display that may or may not communicate with a process. As described above, such device elements may include elements only of the display which is a stand-alone device. In certain environments, for example, the HMI may be a communications device, such as a cell phone, a location device, such as a GPS receiver, or any other human interface device. It should also be noted that the device elements 52 need not all have a viewable content component. That is, many device elements may be configured that are not represented in either the browser of the design-time environment or the viewable screen of the HMI itself. Such device elements may perform computations, control functions, locating functions, in various processing that is simply not viewed by the user.

The services module 100 and the run-time engine 40 communicate with a database services module 102 and with one another. As described more fully below, the services module 100 loads and maintains services (e.g., DLL's), such as a stack and server software as a single process space. The run-time engine or environment 40 itself may include a range of software components or device elements, such as a shared memory manager, a development system manager, a display manager, a project manager, and so forth. The run-time engine 40 interfaces with the device elements 52 and with various other software, which also may be configured as device elements. Among the noted software components, is a display manager 104 that interacts with an OS/GDI subsystem 112 and a suitable driver 114 to provide viewable content to the display hardware 56. Similarly, run-time engine 40 interacts with a storage manager 106 and suitable driver 116 to write and read data from storage hardware 64 within the HMI. The run-time engine 40 to also interacts with a controller/PLC access control module 108 and suitable driver 118 to provide access during interaction with any remote controllers or PLC's, particularly in automation context. Finally, the run-time engine 40 interacts with an input manager 110 and suitable driver 120 for overseeing the inputs from input hardware 60, such as actual or virtual push buttons, a mouse, a keyboard, and so forth. As also noted in FIG. 4, a system module 122 can interact with the server software 28 to provide direct access through a suitable drive 124 to remote system hardware 86.

Figure 5:
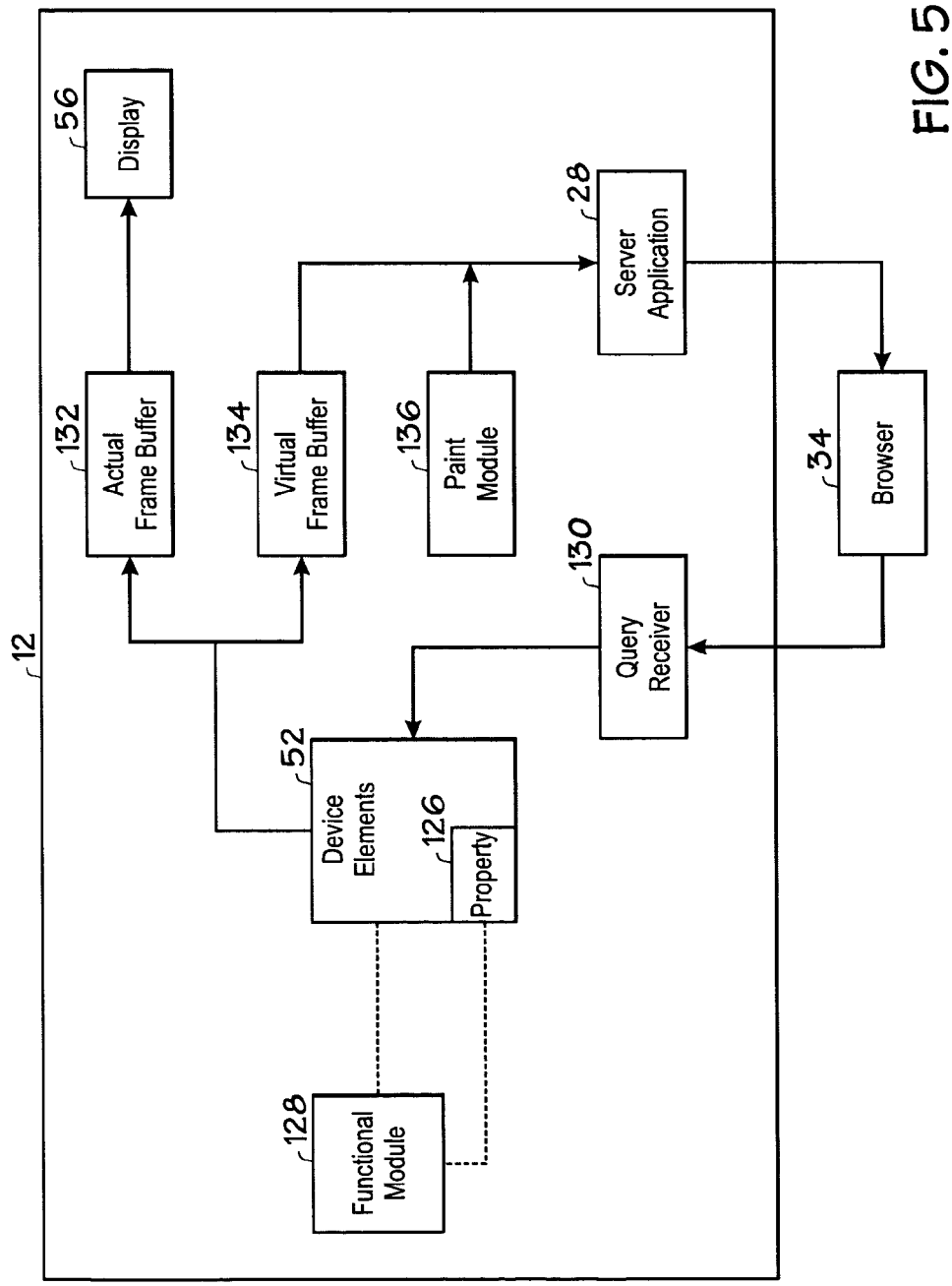
FIG. 5 is a block diagram of certain of the functional components of an interface particularly suited for parallel display of visual elements corresponding to device elements contained within the interface.

FIG. 5 is a block diagram generally representing a configurable interface and its interaction with a browser in accordance with embodiments of the present technique. The configurable interface is generally referred to by reference number 12. The configurable interface 12 is adapted to communicate with browser 34. For example, a "paint" module 136 resident on the configurable interface 12 may signal the browser 34 to "repaint" a graphic display presented by the browser 34 based on changes to certain visual properties residing in software components of the configurable interface.

Specifically, FIG. 5 illustrates the configurable interface 12 including a device element 52 that is adapted to provide a functional module or portion 128 for configuration in the designations environment. The device element 52 includes a property 126, such as relating to a pictorial view of the functional module 128. The configurable interface 12 also includes a query receiver 130, an actual frame buffer 132, a virtual frame buffer 134, a display 56, and a server application 28 as described above.

Embodiments of the present technique relate to abstracted display building based on modification to software components via queries. Queries are utilized in accordance with embodiments of the present invention to transfer configuration input to software components in the configurable interface from a browser application on the configuration station. In one embodiment, communication is facilitated between the configurable interface and the configuration station by unique utilization of a server, such as an ASP (Active Server Pages) server as mentioned above. Accordingly, modifications may be made to an HMI by composing new or modifying existing screen instructions, and by adding, removing, or modifying device elements called or executed in response to user inputs made by reference to the displayed HMI screens. A design can manipulate graphical representations on a browser to change actual control objects on the HMI. Changes to graphical representations on the browser are submitted as a query to the HMI, which receives the query and adjusts aspects of the relevant device elements accordingly. For example, a color property of a graphic feature may be altered through the browser resulting in a query that operates to instruct a relevant functional module 128 of a device element 52 to change its color property, thus changing the color of the corresponding representation on the HMI and within the design-time environment.

In the illustrated embodiment, and as described in greater detail below, the query receiver 130 is adapted to receive queries from the browser 34 and then transmit the query or related information to the device element 52 for implementation (through the intermediaries of the server software and access module described above). For example, the browser 34 may send a request directed to changing a graphical characteristic (e.g., color) of the functional module 128 (e.g., a virtual pushbutton) as a query. The query receiver 130 receives the query and transmits it to the software component 52 for implementation. Once the request is transmitted, the software component 52 implements the query by manipulating the property 126 in accordance with the query. For example, a designer may change a color of a virtual gauge being represented on the browser 34 from red to blue by manipulating the representation on the browser 34. By thus manipulating the representation on the browser 34, the designer initiates the query that eventually results in changing the property 126 from a value relating to the color red to a value relating to the color blue.

In accordance with embodiments of the present technique, the property 126 will be changed in the actual device element 52 and browser representations. Specifically, in one embodiment, a query relating to new property information is submitted through the browser by manipulating representations of particular software component properties on the browser. This new property information is submitted as a query to the configurable interface 12 and related changes are implemented in the device element 52. The device element 52 then responds by submitting a communication describing the newly implemented property information to the browser 34, which displays revised property representations. This provides a real-time view of changes in configuration while allowing configuration via the browser 34. In one embodiment, changes are made by directly accessing system memory. However, such changes may be made to the actual frame buffer 132 and/or the virtual frame buffer 134 in parallel with changes to memory in the configurable interface 12. Thus, as described below, the design-time environment may provide one representation (e.g., in the browser) of the changes, while the HMI display itself also reflects the change in parallel via the run-time environment or engine.

The device elements available to configure the configurable interface 12 (e.g., HMI 12) and/or related embedded code are accessed from the configurable interface 12 by a configuration station (e.g., 32) during configuration. Accordingly, concerns relating to revision and capability differences between the related software components (e.g., operating system, device elements, drivers, etc.) and the configurable interface 12 are minimal. Functional aspects of the configuration are not necessarily transferred between the configurable interface 12 and the configuration station. As discussed above, in accordance with embodiments of the present techniques, configuration of the configurable interface 12 is achieved through queries submitted via the browser 34. Indeed, the configuration station and the configurable interface 12 do not even need to have, and typically will not have the same operating system.

Figure 6:
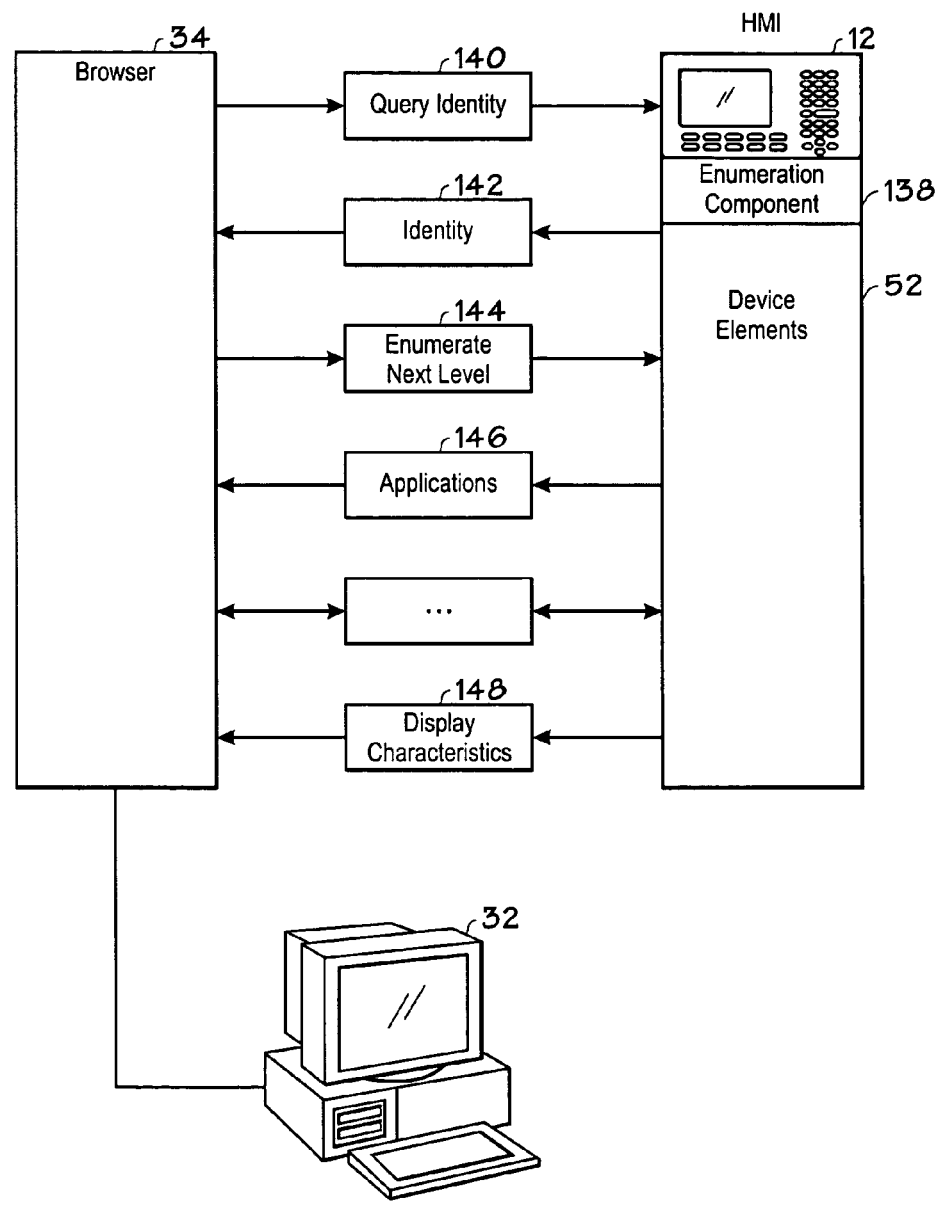
FIG. 6 is a general overview of certain of the steps or acts performed between a browser on a configuration station and device elements within an interface in accordance with aspects of the present technique.

FIG. 6 is a flow diagram generally representing a configurable interface and its interaction with a browser in accordance with embodiments of the present technique. The configurable interface, which is generally referred to as HMI 12, includes device elements 52 and is adapted to interact with a browser 34. As illustrated, this interaction between the HMI 12 and the browser 34 facilitates dynamic representation of configuration of the device elements 52, which are resident on the HMI 12. Further, the interaction includes enumeration by an enumeration component 138 of the HMI 12 (by interaction of the HMI components as described below). It should be noted that the browser 34 may be resident on a remote configuration station 32 (e.g., a laptop computer) in accordance with present embodiments. It should also be noted, however, that configuration may be provided directly on the HMI through the same techniques and architecture described herein.

In the illustrated embodiment, the browser 34 communicates with the HMI 12 by sending queries and receiving responses. For example, in the illustrated embodiment, the browser 34 initiates communication by sending an identification query, as illustrated by block 140, to the HMI 12 requesting specific identity information for the HMI 12. After receiving the query 140, the HMI 12 processes the request and responds with identification data (e.g., "Model 192 Panel View"), as illustrated by block 142. Additional queries are then used to enumerate levels of the application and device elements on the HMI 12 including enumerating the structure of device elements 52. Indeed, the HMI 12 may have a structured content, such as a tree structure (i.e., a set of linked nodes, each having zero or more child nodes), that is readily enumerated. For example, block 144 represents a query requesting enumeration of a next level beneath the identity of the HMI 12. Further, block 146 represents a response corresponding to the query in block 144 indicating what applications are present on the HMI 12. This query and response procedure continues, in accordance with embodiments of the present technique, until display characteristics of the software components are enumerated, as illustrated by block 148. In one embodiment, the query and response procedure continues until an entire tree structure of elements resident on the HMI 12 has been enumerated. It should be noted that much or all of such enumeration may be transparent to the designer, who will be interested in one or more properties of a device element at a time.

In one embodiment of the present technique, once the structure of the HMI 12 has been enumerated, a view is configured for display via the browser 34. For example, a graphic component, such as a Joint Photographic Experts Group or JPEG image may be constructed based enumerated properties and served to the browser 34 as the view or as a portion of the view. Such a JPEG image may correspond to a particular device element. For example, the JPEG image may be representative of particular enumerated display characteristics for a device element. Specifically, the JPEG image may represent a virtual pushbutton or gauge. Further, configuration tools may be served to the browser. Indeed, the view itself may act as a tool for manipulating characteristics of the related device element. Also, for example, a separate display palette may be served to the browser to facilitate reconfiguration of the color of a particular device element.

Figure 7:
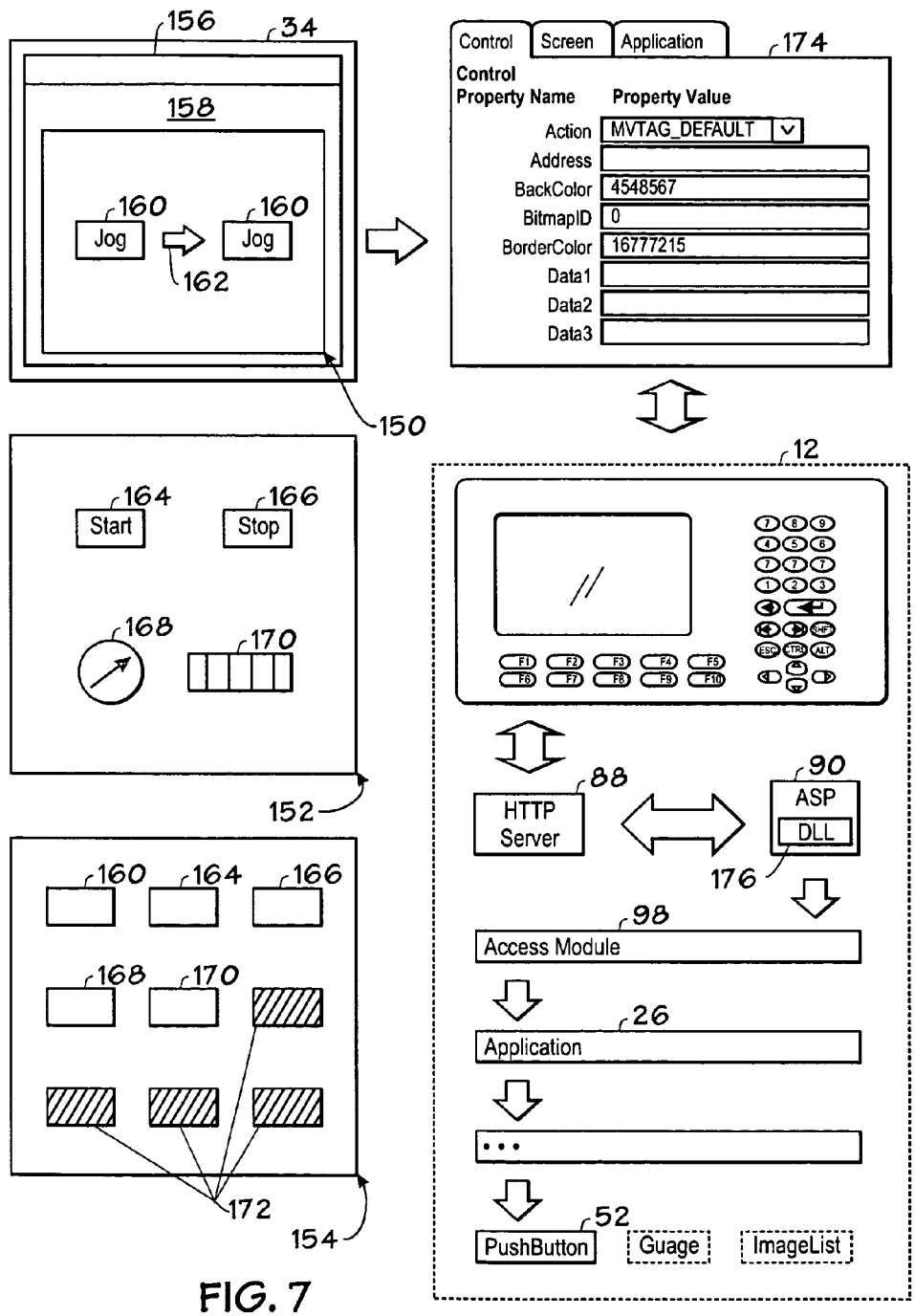
FIG. 7 is a general overview of certain views or containers of device elements and a preferred manner in which they interact to provide rapid access to various views as well as programming and configuration of the device elements themselves.

FIG. 7 is a flow diagram illustrating manipulation of a graphical feature relating to a device element in a design-time environment in accordance with embodiments of the present techniques. While FIG. 7 illustrates a single variable manipulation, multiple graphical features and properties can be manipulated in the same way. The flow diagram includes interactions illustrated by relationships between a display 156 (e.g., a screen for browser display), a property editor 174, and an HMI 12. Specifically, the diagram illustrates exemplary activities associated with moving a device element image 160 represented on the display 156 using a browser 34.

The design-time environment represented by the configuration screen or display 156 includes static content 158 and dynamic content. The dynamic content includes images corresponding to any displayed or represented device elements 160 (e.g., virtual on/off button, gauge). In one embodiment of the present techniques, the image is specified by an image tag in HTML and is part of a JPEG file created by the HMI as described below. The static content 158 may be created by the ASP server or it may preexist in an HTML file. It should be noted that, in some embodiments, designated designers only can edit the static content 158.

In the representation of FIG. 7, the device element representations 160 are contained within a view container 150. As will be appreciated by those skilled in the art, a container generally defines a portion of a processing space in which certain device elements are opened and ready for use. The container 150 may thus correspond to a first view container that includes only the elements viewable within the current screen. As discussed above, many such screens may be provided in the HMI. Other screens, such as alternative control or interface screens may be provided in other view containers, such as a container 152. In general, to speed the operation (e.g., changing between screen views) of the HMI, such view containers are predefined and associated with one another by definition of the individual device elements with which they are either associated or within which representations of the device elements are provided. A global container 154 is defined that include all of the device elements necessary for the various view containers, as well as other elements that may not be represented in any view container. As illustrated in FIG. 7, therefore, view container 150 includes the virtual button 160 which performs a "jog" function and is manifested by a representation in a first screen. New container 152 includes several components, such as a "start" button 164, a "stop" button 166, a virtual gage 168 and a digital readout 170. The global container 154, then, will include all of these device elements for the various view containers, as well as any device elements 172 that are required for operation of the viewable device elements but that are not themselves viewable. Such device elements may include elements that perform computations, trending, communications, and a wide range of other functions.

In accordance with aspects of the present technique, all device elements that are needed for the various views are opened during operation of the HMI and remain open in a single global container 154. However, utilizing aspects of current technologies, known as "tear-offs" any device elements that are not required for viewing or operation of a current view (i.e., a view currently displayed on the HMI or configuration station view) are reduced in size to reduce the memory requirements, processing requirements, and to facilitate operation of the HMI. The "torn-off" device elements nevertheless remain open and active such that change in between screen views is extremely rapid and efficient from memory utilization and processing standpoints.

As illustrated by arrow 162, in an exemplary change or configuration operation, button 160 is moved from one location to another within the display 156. For example, a system in accordance with embodiments of the present technique may include an input device, such as a mouse, that facilitates designer manipulation of the image 160. Client script from the display 156 or some other source running in the browser 34 may be used to monitor device events in the display 156. Specifically, for example, when a mouse press event (e.g., clicking a mouse button) is detected over an image (e.g., image 160) that is tagged as an image and that represents a device element representation, the client script begins tracking the movement and repositioning the image 160 relative to the updated mouse position. In one embodiment, the client script continues to track the mouse movements as long as the mouse button is in a depressed position. When the mouse button in released, a call is passed to a property editor 174 indicating that a device element representation move has been completed. In an alternative embodiment, multiple button presses may be used to initiate the call. For example, depressing the mouse button once may initiate tracking and pressing the mouse button a second time may indicate that the move is complete.

Figure 9:
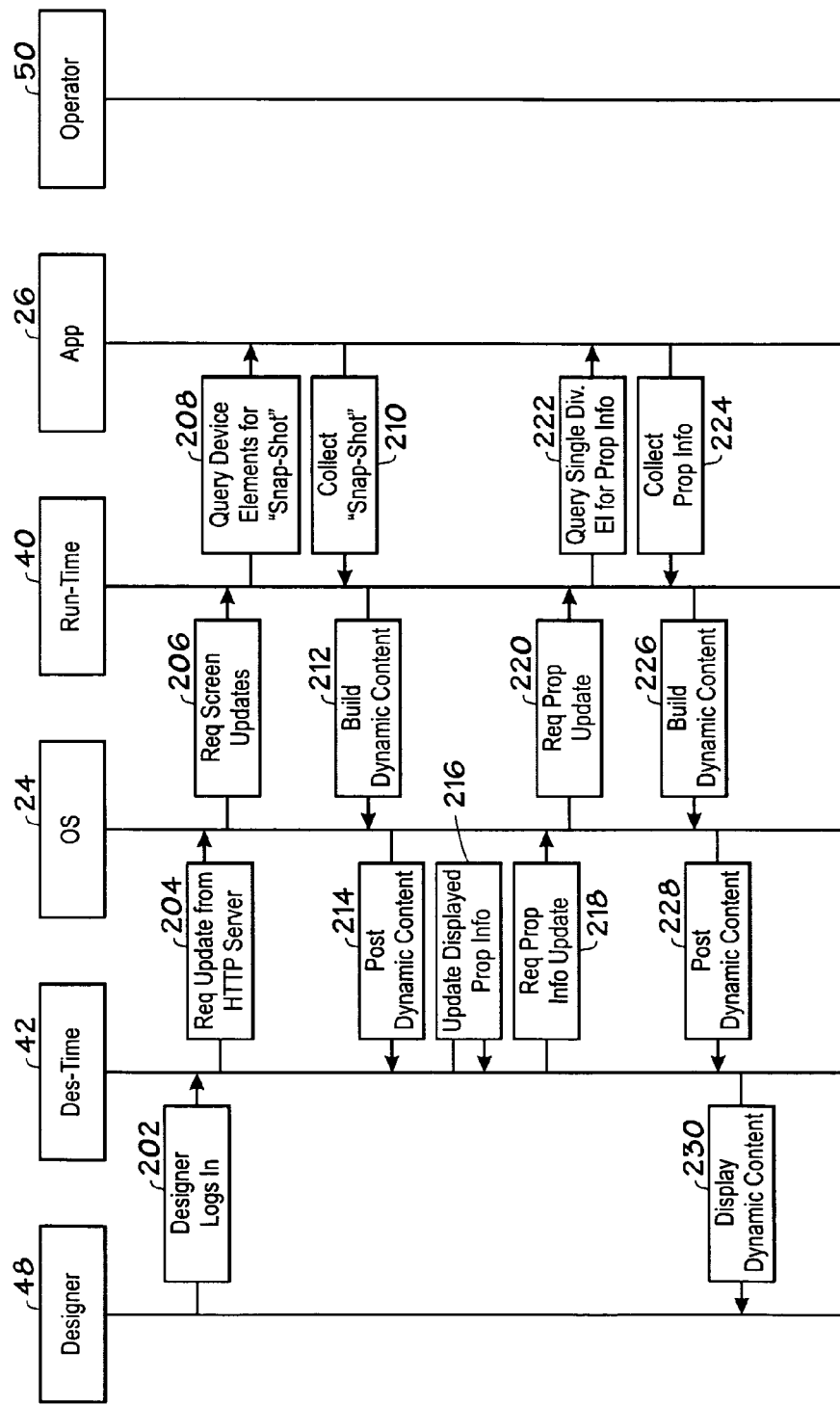
FIG. 9 is a sequence diagram illustrating steps in interacting with a designer for configuring or reconfiguring device elements or properties of such elements.
Figure 10:
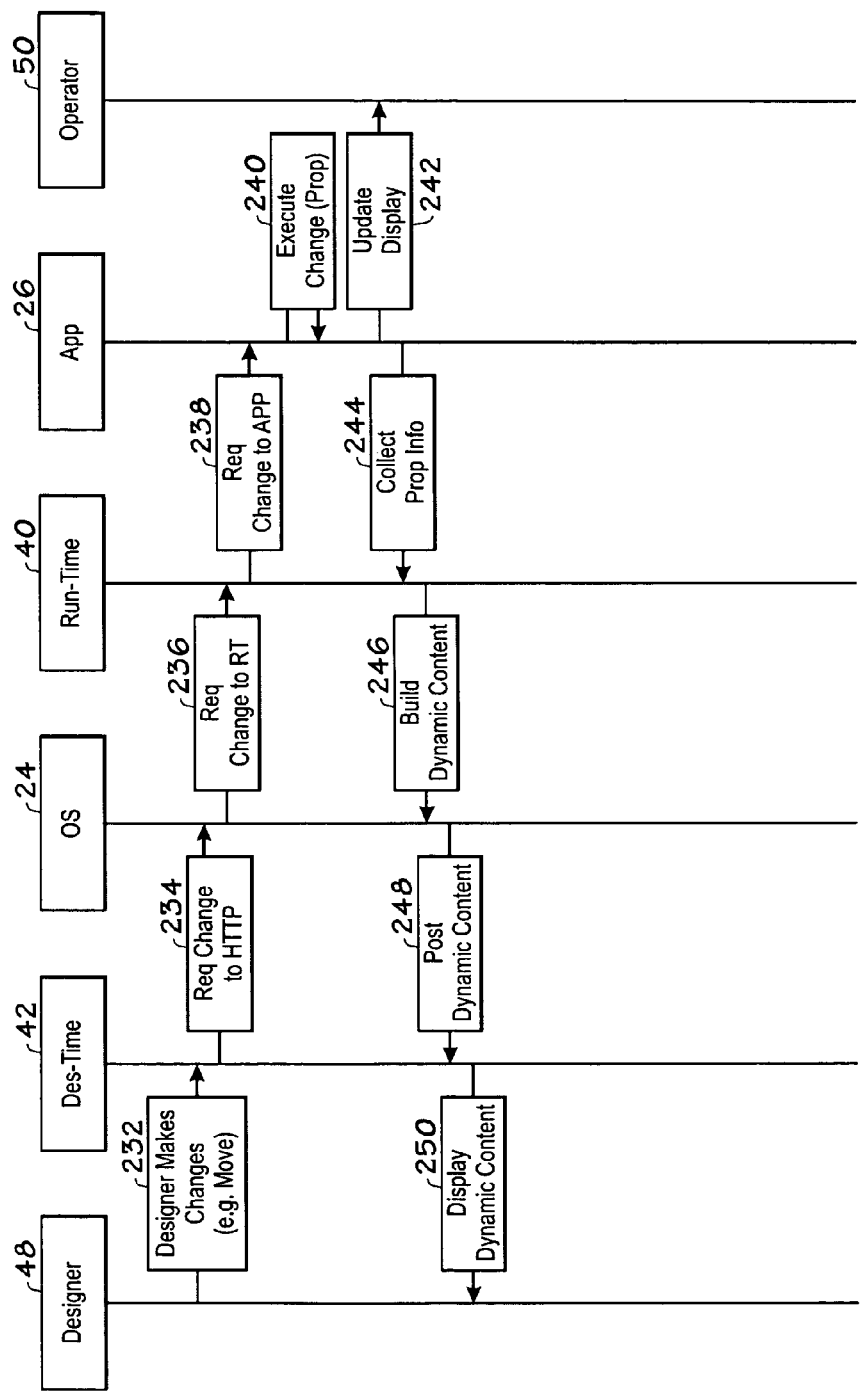
FIG. 10 is a further sequence diagram illustrating interaction with an interface by a designer in accordance with aspects of the present technique.

Upon receiving the call, the property editor 174 reloads itself as described more fully with reference to FIGS. 9 and 10. In one embodiment, this reloading includes passing a move command object pointer, and positional data via a query string from the browser 34 to server 88 (e.g., HTTP server) that is resident on the HMI 12. For example, http://10.82.77.11\MvPropertyASP@M001200200 is an exemplary reload string that may be passed to the server 88. The server 88 cooperates with ASP server 90 including a dynamic-link library (DLL) 176 to receive and respond to queries. The DLL 176 allows for storage of executable routines as separate files, which can be loaded when needed or referenced by a program. In the example set forth above, upon receiving the call, the page is reloaded by the ASP server 90 and the query string is initially parsed resulting in evaluation of the move command. Server side script then invokes the access module 88 to access the device element 52 related to the image 160 and to update its location property. The new property information is then updated on the page and the page is passed to the browser 34.

In one embodiment of the present techniques, user prompting via the display 156, such as the previously described mouse release event of the image 160, causes the reload of the property editor 174 alone. For example, in one embodiment, the display 156 is not reloaded based on the mouse release event. Indeed, in accordance with embodiments of the present techniques, code may actually use functionality that will not require the entire property page to reload.

Figure 8:
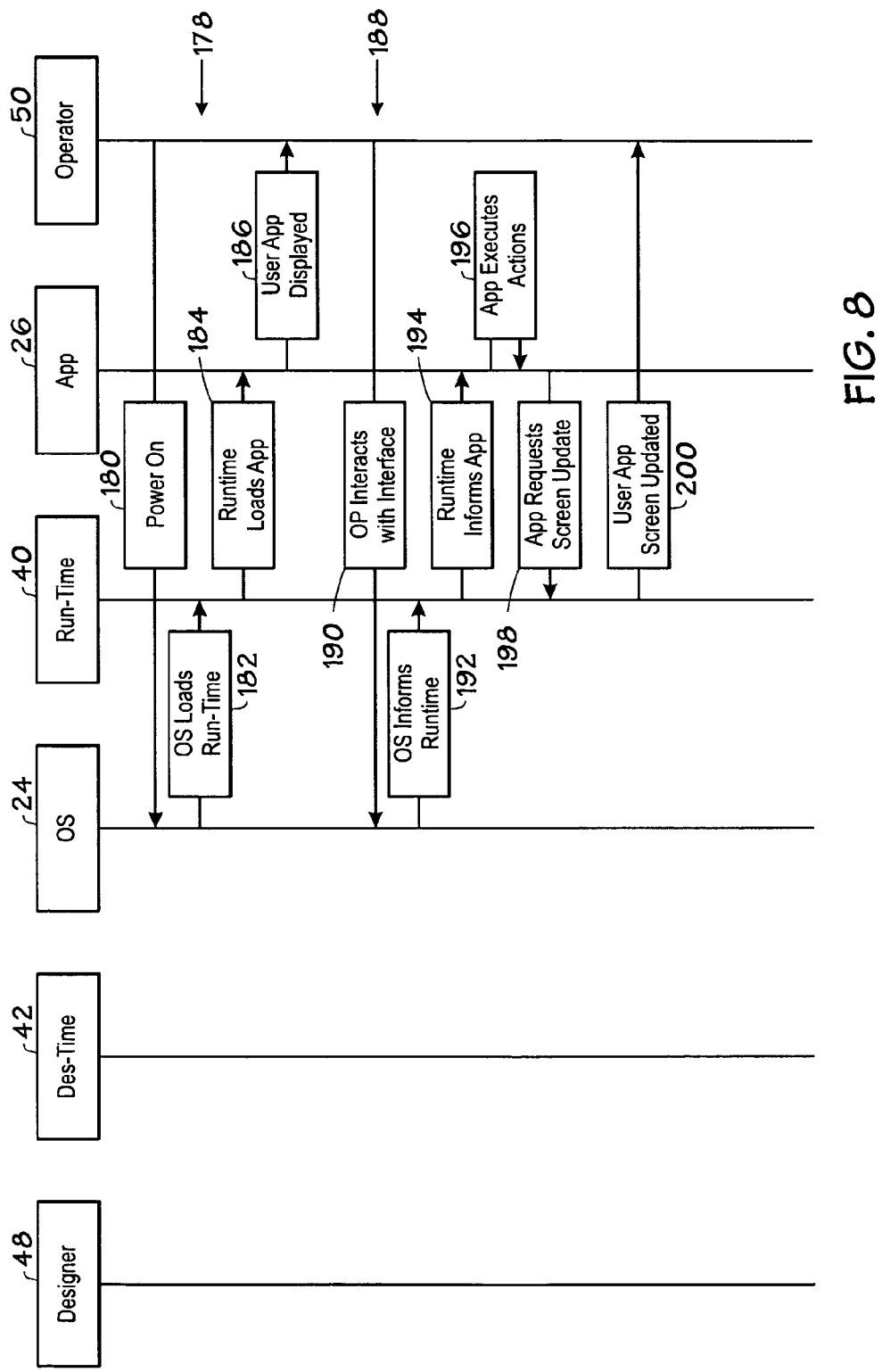
FIG. 8 is a sequence diagram of two exemplary sequences of steps that are carried on within an interface in accordance with aspects of the present technique for interacting with an operator.

FIG. 8 is a sequence diagram for certain operations performed on the HMI or rather configured as described above. In the illustration of FIG. 8, various persons and components generally are represented with operations performed between these entities being shown. The entities involved include a designer 48 and an operator 50 as well as a design time environment and its components 42, the operating system 24, the run-time environment and its components 40, and the resident application of the HMI 26. In the illustration of FIG. 8, a first series of events are designed to display one or more screens programmed into the HMI for an operator. This sequence, identified generally by reference numeral 178 in FIG. 8, is performed when an operator desires to use the HMI. As a first step, the operator powers up the HMI as indicated by step 180. Powering up the HMI activates the operating system 24 which loads the run-time components as indicated by step 182. Loading the run-time components includes opening and executing all device elements that are required for the various screen views accessible and viewable on the HMI, as well as any device elements that do not include viewable properties. Upon loading the run-time components, the run-time environment loads the application as indicated at step 184. Loading the application instantiates all device elements required for the various views. As noted above, only the currently viewed screen elements, and any device elements required for those elements are fully opened, with other elements being executed in the global container, but torn off to improve memory utilization and processing speed. At step 186, then, the screen views as defined by the run-time environment and application are transmitted to the HMI display for viewing by the operator.

Also represented in FIG. 8 is a sequence corresponding to interaction by an operator with the HMI. In general, this sequence, designated generally by reference numeral 188, is initiated by the operator interacting with the interface as indicated at step 190. Step 190 may be, in practice, initiated by depressing a virtual actual button, touching a location on a touch screen, or inputting information by any other means, such as by a control device, mouse, laptop computer, or otherwise. The operating system 24 detects the input event and informs the run-time environment as indicated at step 192. As a result, the run-time engine informs the application 26 of the input events, and the application, by interacting and with an interaction between active device elements executes any required actions as indicated by reference numeral 196. It should be noted that such actions are generally defined by the state engine of one or more device elements. The state engine of each individual device element may, for example, call for reading a value from a particular register via a network, making a particular calculation, executing trending, updating a view based upon a register value, outputting a value to a device or register, and so forth. At step 198, then, the application requests a screen update from the run-time engine 40. The screen update will, in many cases, choose the appearance of the representation of a device element based upon a change in state. Upon updating of the screen, the displayable view is updated and transmitted back to the display device for viewing by the operator, as indicated by step 200. Thus, the terminal screen will visually indicate the response to the operator interaction.

It should be noted that, as described more fully below, among the many operations that can be performed by the device elements at step 196, such as color changes, sending and receiving values to external registers, and so forth, various direct connections may be made between device elements that greatly facilitate the overall system functionality. For example, a "connection" may be defined between two or more elements such that the receipt of data by one element causes the immediate transfer of the data to a different element. Thus, elements can transmit data immediately among themselves without processing the data by such connections. The operations performed by each element upon receipt of the data are then defined by the programming of the function (or "method") of the state engine of the receiving device element. Thus, as described more fully below, device elements can be caused to mirror or mimic functions of one another (e.g., to provide similar elements viewable at different locations without rewriting redundant code), or entirely different operations can be performed based upon data of interest to multiple device elements.

FIG. 9 represents a sequence of events between the same entities demonstrated in FIG. 8, but for building and displaying dynamic content for configuring or reconfiguring the HMI. The process illustrated in FIG. 9 begins at step 202 where the designer logs into the HMI. This operation may be performed by accessing the HMI via a general purpose browser, such as by typing in an IP address for the HMI in a location window. Various types of access control may also be performed at step 202, such as to limit access to all or part of the configuration functionalities to one or more types of level of designer. For example, initial configuration of the HMI may be performed at a factory, with certain adaptations or user preferences being configurable by access, in a more limited manner, to the device elements as described below. At step 204 the design time engine requests an update from the HTP server. In the terms of the components illustrated in FIG. 4, the request is in a form of a request including an ASP extension transmitted via the TCP/IP stack 96 to the server module 28. At step 206, then, the operating system requests screen updates from the run-time engine. The run-time engine acquires the screen updates by querying device elements for "snap-shots" as indicated at step 204. Step 206 includes enumeration of the various device elements necessary for the particular screen update, and is performed by calling upon the access module 98 shown in FIG. 4 which communicates with the particular device elements of the viewed screen. At step 208, then, the active screen elements are drawn to a memory space as to display the images corresponding to the active elements. At step 210 these "snap-shots" are corrected and converted to JPEG image elements, or to a binary format.

Based upon the image requirements for the various active device elements needed for the view to be presented to the designer, dynamic content is built for viewing as indicated at step 212. Essentially, building of the dynamic content involves determining where certain snap-shots are to be located in a view, and writing HTML tags with the JPEG image data and the corresponding locations for all active panel elements (i.e., device elements having a representation viewable in the screen to be considered). It should also be noted that the building of the dynamic content at step 212 is done in a memory space that is separate and parallel to the memory space used to actually present data to an operator on the FIMI. Thus, through the steps of FIG. 9 dynamic content is built and presented without any prior knowledge of the underlying functionality or structure of the device elements or their interconnections. At step 214 the dynamic content is posted to a display frame. Exemplary illustrations of such display frames are provided in the figures below. At step 216 property information, as enumerated at steps 206 and 208 is updated for presentation in a property frame as described more fully below. At step 218 property update information is requested based upon the property information update, a request for property update is generated by the operating system 24 and transmitted to the run-time engine 40 as indicated at step 220, essentially, step 220 is similar to step 206, with both steps generally including additional levels of enumeration of the device elements. Such multiple levels of enumeration are also described above with reference to FIG. 6. At step 222, then, each individual device element is queried for its property information that will be displayed in the property frame. Many such levels of enumeration may be performed, particularly to determine configuration of applications, elements, properties, and with each level itself being capable of having additional device elements and properties associated therewith. At step 224 the property information is collected, such as in the form of an HTML page table.

At step 226, then, the dynamic content of the property frame is built again, in a manner similar to the functions performed at step 212 discussed above. The dynamic content is then again posted as indicated at step 228, and ultimately the dynamic content is displayed as indicated at step 230. In terms of the components illustrated in FIG. 4 and discussed above, such functions are performed by interaction of the server module 28 with the run-time engine 40 and access module 98 which instantiate and enumerate the various device elements to determine their various properties. In all of these operations, again, the static and dynamic content is served to the designer, with the content being written to a memory space separate from the frame buffer used for the HMI display itself.

FIG. 10 represents a similar sequence of steps for interaction between a designer and HMI but for changing one or more aspects of a device element. In the sequence of FIG. 10, a designer first makes a change to a design element as indicated at reference numeral 232. Such a change may, for example, correspond to a move event such as for moving representation 160 illustrated in FIG. 7 to a new location as indicated by arrow 162 in FIG. 7. At step 234 the design-time engine 42 formulates a request for a change that is transmitted to the operating system 24. Such request, as before, will typically be in the form of a query string, such as for invoking scripting by reference to an ASP extension. At step 236, the requested change is transmitted to the run-time engine. At step 238, the request is made to the application 26. In response to the request, the application, which will have enumerated the instantiated device elements as before, executes a change to the corresponding property as indicated by reference numeral 240. The change in the property actually changes the configuration of the device element affected by the change. More than one such device element may be affected, such as both on-screen representations and device elements which are open in the global container but do not correspond to a representation on the viewable screen.

At step 242 the terminal display (i.e., the HMI display) is updated to reflect the change. It should be noted that updating of the display at step 242 affectively is performed by the run-time engine 40 and application working in parallel through the display manager and other components illustrated generally in FIG. 4 and discussed above. Thus, changes in the view on the device itself and as dynamic content in the design-time environment displayed in the browser of the configuration station are represented in parallel, without directly affecting the run-time utilization made by the operator. Again, such parallel building of the views is performed in quite different manners, that is, the updated display provided to the operator at step 242 is performed through the actual run-time engine 40, whereas in the steps to follow, representation of the change provided in the design-time environment is without direct reference to the actual functionality underlying operation of the design elements, but is merely a representation of images provided through the dynamic content.

At step 244, the updated property information is collected as in step 224 of FIG. 9 and dynamic content is built including representation of the change as indicated at step 246, which is generally identical to step 226 above with reference to FIG. 9. At step 248 the dynamic content is again posted as it was at step 228 in FIG. 9, and the dynamic content is again displayed at step 250. At this point the configuration of the device element is complete.

Figure 11:
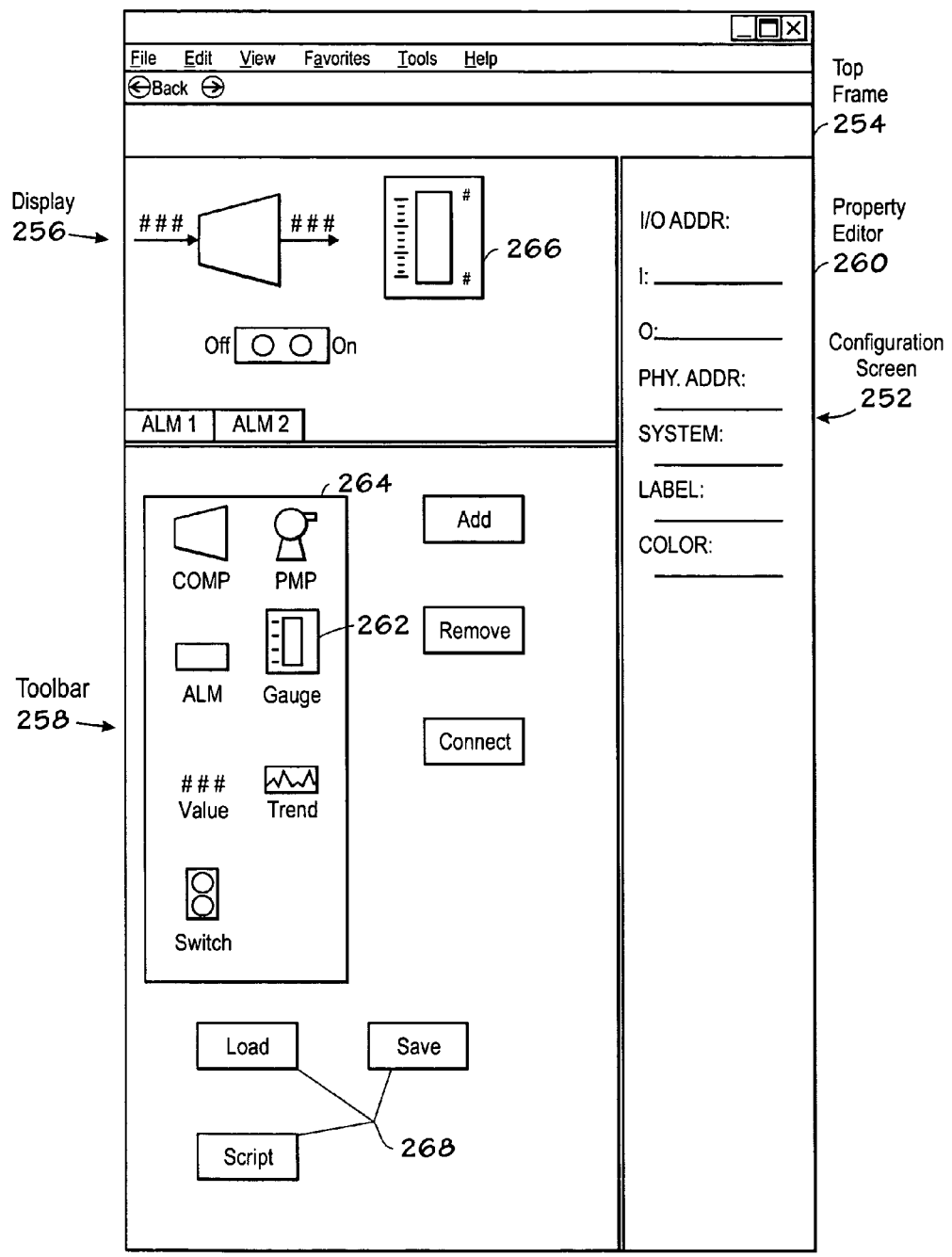
FIG. 11 is an exemplary illustration of a configuration screen as may be used to modify device elements or properties of device elements.

FIG. 11 is a representation of an exemplary configuration screen that is part of a remotely accessible design environment in accordance with embodiments of the present technique. Specifically, the illustrated embodiment represents a design environment, as viewed through a Web browser, including a frameset with four major sections. In one embodiment of the present technique, a frame appears in a Web browser as a scrollable window in which pages can be displayed.

The configuration screen may be generally referred to by reference numeral 252. As illustrated, the configuration screen 252 comprises exemplary sub-screens (i.e., frames) that allow configuration of a markup language page for utilization as an HMI graphical interface screen. Specifically, the configuration screen 252 includes the following frames: a top frame 254, a display frame 256, a toolbar frame 258, and a property frame 260. The top frame 254 is adapted to present a logo and/or banner that are editable by designated designers. The display frame 256 is adapted to facilitate management of selection, positioning, and sizing of device elements in a current view. The property frame 260 is adapted for editing properties of selected design elements, applications, and views. The toolbar frame 258 is adapted for selecting/adding/removing design elements and/or views, managing connections, loading/saving applications, invoking test scripts, and so forth. While other screens and sub-screens may be employed, the present representation illustrates only certain exemplary aspects in accordance with present techniques. It should be noted that these screens may be accessed in accordance with the present techniques from a remote configuration station using a standard Web browser.

It should be noted that although "frames" are illustrated and discussed herein for display of device element visual representations, and for display of device element properties, in practice any suitable display area, space or technique may be used for providing these to the designer or user. For example, as will be appreciated by those skilled in the art, "frames" are generally considered to be separate browsers or browser sections. Alternatively, the static and dynamic content may be provided in a single browser or browser segment. Moreover, such data and indicia may be included in separate browsers or screens, or in drop-down menus, or any other screen device.

The illustrated embodiment relates to accessing and displaying certain pages in each of the four major sections or frames. For example, in one embodiment of the present technique, a remote browser accesses an HMI and loads a default page having a ".htm" extension (e.g., default.htm) whereupon the browser is instantly re-routed to a default page having an "ASP" extension (e.g., defaultASP). The "ASP" extension instructs an HTTP server relating to the browser to load and process the page as ASP content as described above. The "ASP" file (e.g., default.asp) includes stored script, which relates to global functionality. In one embodiment of the present technique, the script creates a base for the device element corresponding to the access module 98 described above. The global functionality is adapted to be called by child pages that are loaded into a frameset, the frameset having been created by the "ASP" file. For example, a particular "ASP" file (e.g., default.asp) can be the parent frameset and can be accessed by a child frame. The display frame 256, the toolbar frame 258, and the property editor frame 260 are pages loaded into each separate frame.

In one embodiment of the present techniques and as described above, when the property frame 260 loads, the server software uses the access module 98 to query an active or selected device element (e.g., a selected virtual button) and then causes enumeration or properties of the active device elements. These active device elements can be applications, views, system elements, control elements, and so forth. In one embodiment, when the display frame 256 loads, it is loaded as ASP content and a script section of the display frame 256 queries the internal access module for current view information and instructs the view to draw images of all design elements of the current view and output them as JPEG files written to a virtual frame buffer or frame memory as described above. The display ASP then builds HTML tags linked to the JPEG files and adds positional data that is also queried from the control elements via the access module, also as described above. In one embodiment, the toolbar frame 258 uses the access module to manage its functionality.

The display 256 may include an HTML document creation screen that utilizes screen instructions and links to provide an operable HTML page. However, in some embodiments, the screen instructions are in a scripting language. The screen instructions may be programmed to facilitate navigation through various screens (e.g., HTML pages), programs, and functions corresponding to various different user inputs (e.g., input from a mouse). The links may reference and incorporate device elements adapted to facilitate interfacing of the HTML page with external input/output components. Indeed, a device element may be linked with an HTML page to facilitate an interface between an HMI and certain process components, where the HMI utilizes the HTML page as an operator interface screen. For example, in accordance with present techniques, by dragging-and-dropping a process device element icon (e.g., "gauge" icon 262) from a device element menu 264 in the toolbar frame 258 to the display frame 256, a device element may be incorporated graphically into display frame 256. Such a procedure may not only form a graphic 266 but it may also establish a specific design element for facilitating an interface between an HMI and a process. Further, the design element may facilitate configuration of its properties from a remote station via a browser (e.g., its representation, its function or "method", its state engine operability, its connections, and all such properties of lower levels of the device elements-which are themselves device elements). It should be noted that the toolbar frame 258 facilitates manipulation of the display frame 256 with various functions (e.g., functional buttons 268) in addition to the device element menu 264.

Once a graphic, such as graphic 266, is properly located on the page being developed, the property frame 260 may become available for configuration in accordance with the present techniques. The illustrated property editor frame 260 relates to the graphic 266 and other corresponding aspects of the related device element. Such sub-screens may enable a user to define certain properties of related device elements. Indeed, the property frame 260 may enable a user to associate a device element related to the property frame 260 (including the corresponding graphic 266) with an input/output address (e.g., an I/O address on a PLC). For example, a designer may associate a particular button with a register 18 on the control/monitoring device 16 illustrated by FIG. 1. Further, in accordance with present techniques, the property frame 260 may facilitate the incorporation of a tag or label (for identification of the device element), a physical address (for designating the location of related sensors and/or actuators), a dynamic visual component (e.g., logic to change graphic colors based on certain inputs), operational logic, and so forth. For example, a user may utilize the property frame 260 to link a device element including a representative graphic (e.g., a compressor graphic) to an I/O address in a PLC communicating with a status sensor. For example, if the equipment is running, the graphic may be green. Alternatively, if the equipment is down, the graphic may be red. Additionally, logic (i.e., a "method" or function of the state engine, or a connection) in the related device element may send data to an I/O address on a PLC that is connected to an actuator, requesting that the actuator be energized based on the status of the equipment or other feedback.

It should be noted that an extremely useful aspect of both the design-time environment and the run-time environment is that the static content may be adapted to provide a desired "look and feel" to one or all of the screen views. For example, a supplier, reseller or original equipment manufacturer may desire to acquire an interface device from a common manufacturer along with the basic configuration software, run-time engine, design-time engine, and so forth. The device elements themselves may be configured to suit the designer or original equipment manufacturer. Similarly, the static content may be "relegendable" so as to permit the overall look or certain aspects of the look of the interface to be changed as an indication of the preferences of the manufacturer. Such features may include color schemes, banners, and so forth, including indicia or logos of the manufacturer. The relegendable content may be simply stored on the interface device as bitmap files, JPEG images, HTML stylesheets, and so forth. When a change in the relegendable static content is desired, then, the file from which such content is drawn may be simply replaced. The dynamic content is then displayed in or adjacent to the relegendable content, providing a platform for marketing or designation of a source of origin.

Figure 12:
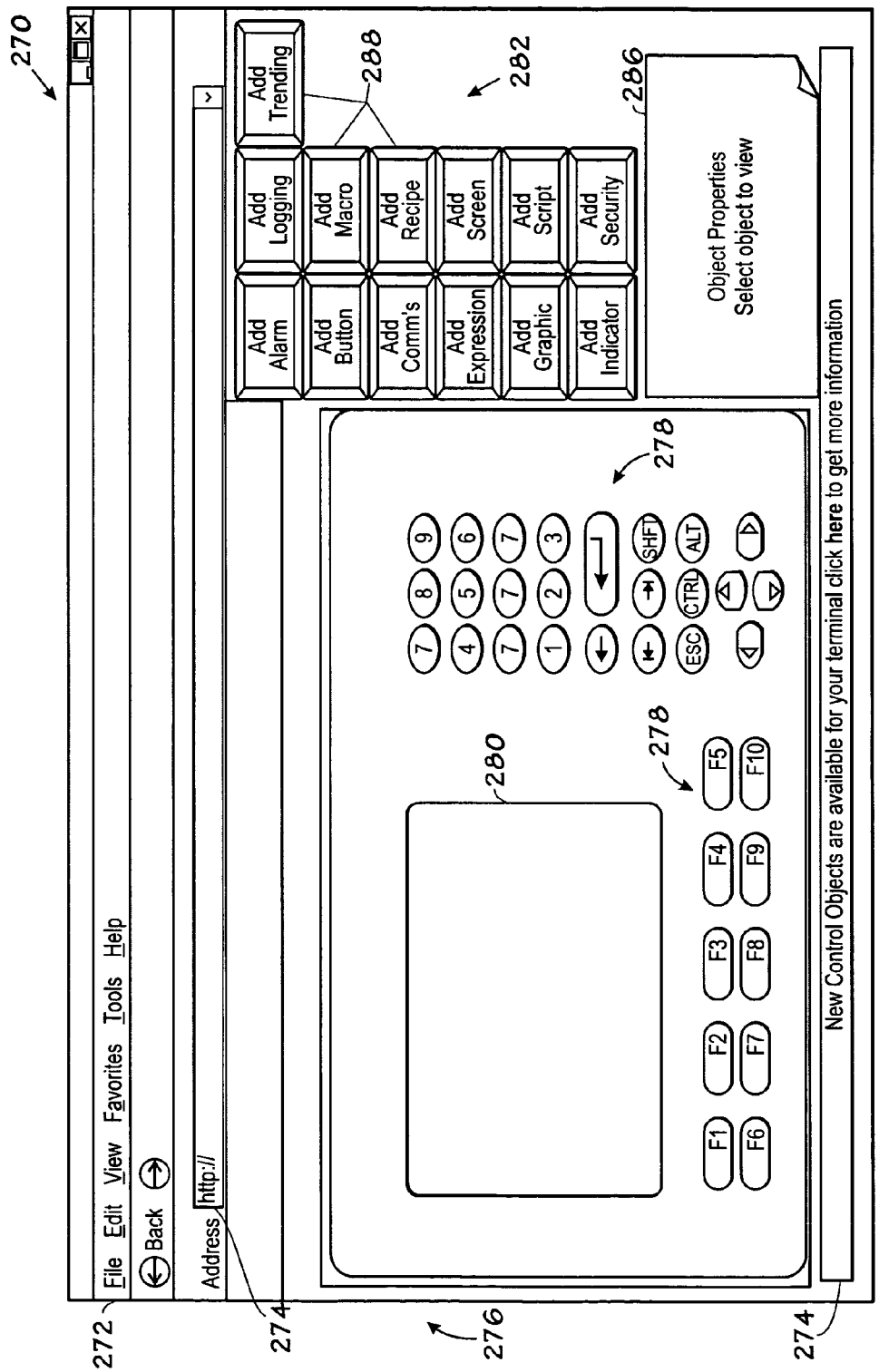
FIG. 12 is an exemplary screen view for configuration of an interface, either for use on an actual interface through information derived from the interface or in an emulation of the interface.

FIG. 12 is another exemplary representation of a configuration screen in accordance with present embodiments. Again, it should be noted that this screen may be remotely accessed. Specifically, FIG. 12 illustrates a browser development view 270 that may be accessed through a browser 272 from a remote station. Indeed, in accordance with present embodiments, this development view 270 may be accessed much like any other web page, from a computer that is linked (e.g., via the Internet) to an HMI. For example, a user having appropriate access status may simply type an address into an address window 274 of the browser 272 and gain access to configuration of the HMI via the development view 270.

It should be noted that the illustrated embodiment of the browser development view 270 includes a development environment 276 that is representative of a physical HMI panel, including buttons 278 and a work screen 280. Indeed, to facilitate operational familiarity, the development environment 276 may include graphics and software functions that emulate configuration directly on the physical HMI. For example, a user may be able to virtually push the buttons 278 and manipulate the work screen 280 in a fashion similar to configuring the HMI directly. Accordingly, an operator that is accustomed to programming an HMI directly on the HMI in the field, may immediately be familiar with the browser development environment 276 because the appearance and functionality mimic an actual HMI.

In addition to the representation of the actual HMI, the development environment 276 may comprise an object assembly tool 282, an update notice banner 284, and an object properties view 286. The assembly tool 282 may comprise virtual buttons 288 that are adapted to implement or insert certain device elements and functions into HMI screens. For example, the push buttons 288 may add alarms, trending, graphics, macros, and so forth to a particular HMI screen. The update notice banner 284 may indicate to a user that certain upgrades are available for download to the HMI. For example, a message on the update notice banner 284 may indicate that new device elements for an object library residing on the HMI are available from a particular website. In some embodiments, the banner may automatically connect a user to the particular website when the banner 284 is selected (e.g., clicked on with a pointer). The device properties view 286 may indicate certain properties of a device element that is selected from the work screen 280. For example, a graphic device representing a pump may be selected on the work screen 280 and properties related to the device such as a tag, a register, a physical address, operational logic, and so forth may then be illustrated in the properties view 286. Other screens and sub-screens may be employed, and the present representation illustrates only certain exemplary aspects in accordance with present techniques.

Figure 13:
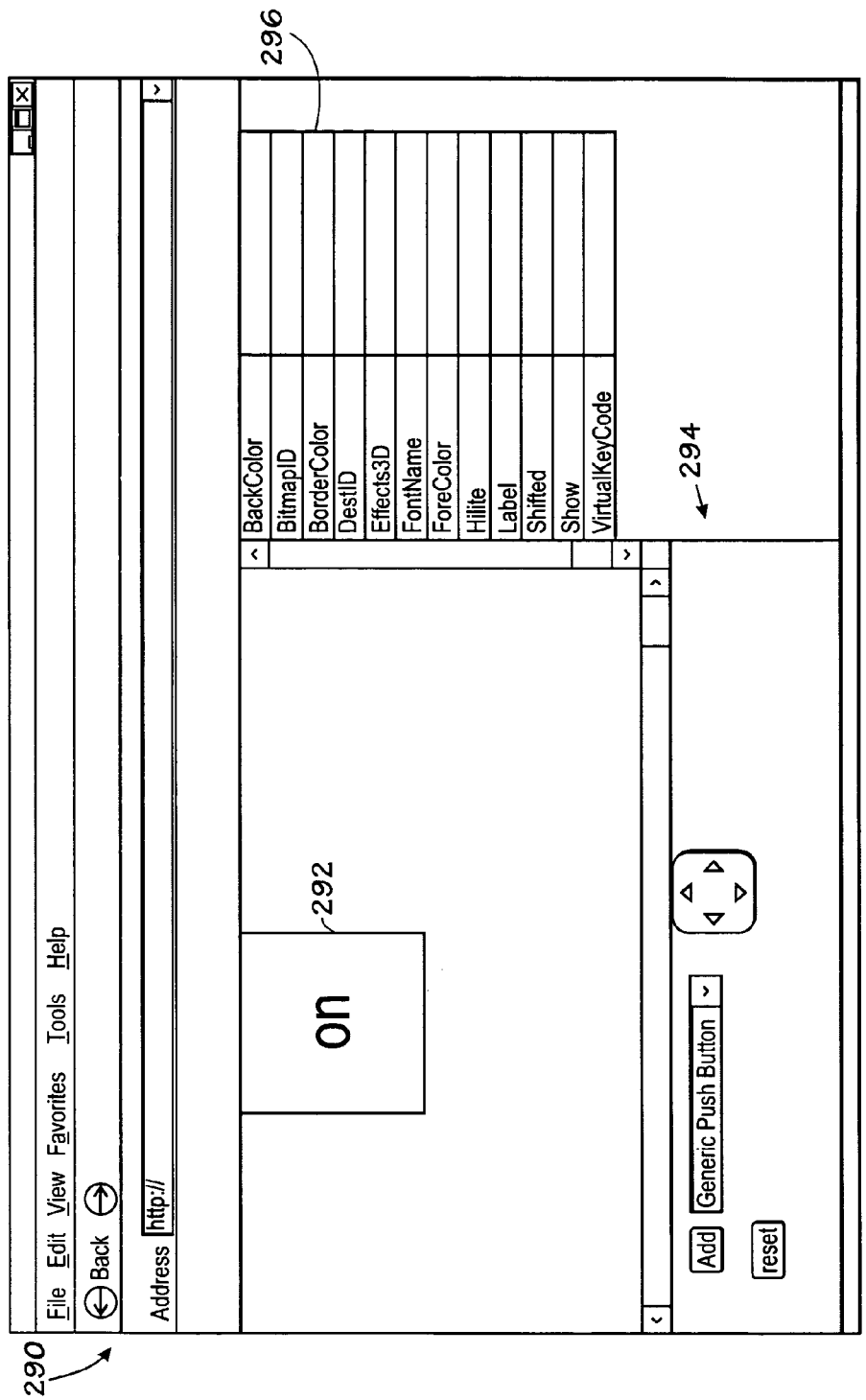
FIG. 13 is a further view of an exemplary configuration page for setting characteristics of device elements.

FIG. 13 is an exemplary representation of a device element configuration screen in accordance with present embodiments. The device element configuration screen may be generally referred to as screen 290. Specifically, the screen 290 may be a screen that is accessible from a development environment (e.g., 252, 276) and that facilitates direct configuration of device elements and graphics through a browser. For example, a user may select a push button 288 in the development environment 276 that adds an on/off button 292 to an HMI graphic. Upon adding the on/off button 292, sub-screen 294 may be accessed and displayed on the browser 272 to facilitate configuration of aspects of the on/off button. For example, visual properties (e.g., color and font) and dynamic links (e.g., associated I/O address) of the on/off button 292 may be edited in sub-screen 294. Further, tools available in a sub-screen 296 may be utilized to manipulate the on/off button graphic and/or add additional graphics and modules from a library, as described above. It should be noted that configuration of a device element relating to the on/off button through the browser is a direct configuration of that element on the HMI in accordance with present techniques.

Figure 14:
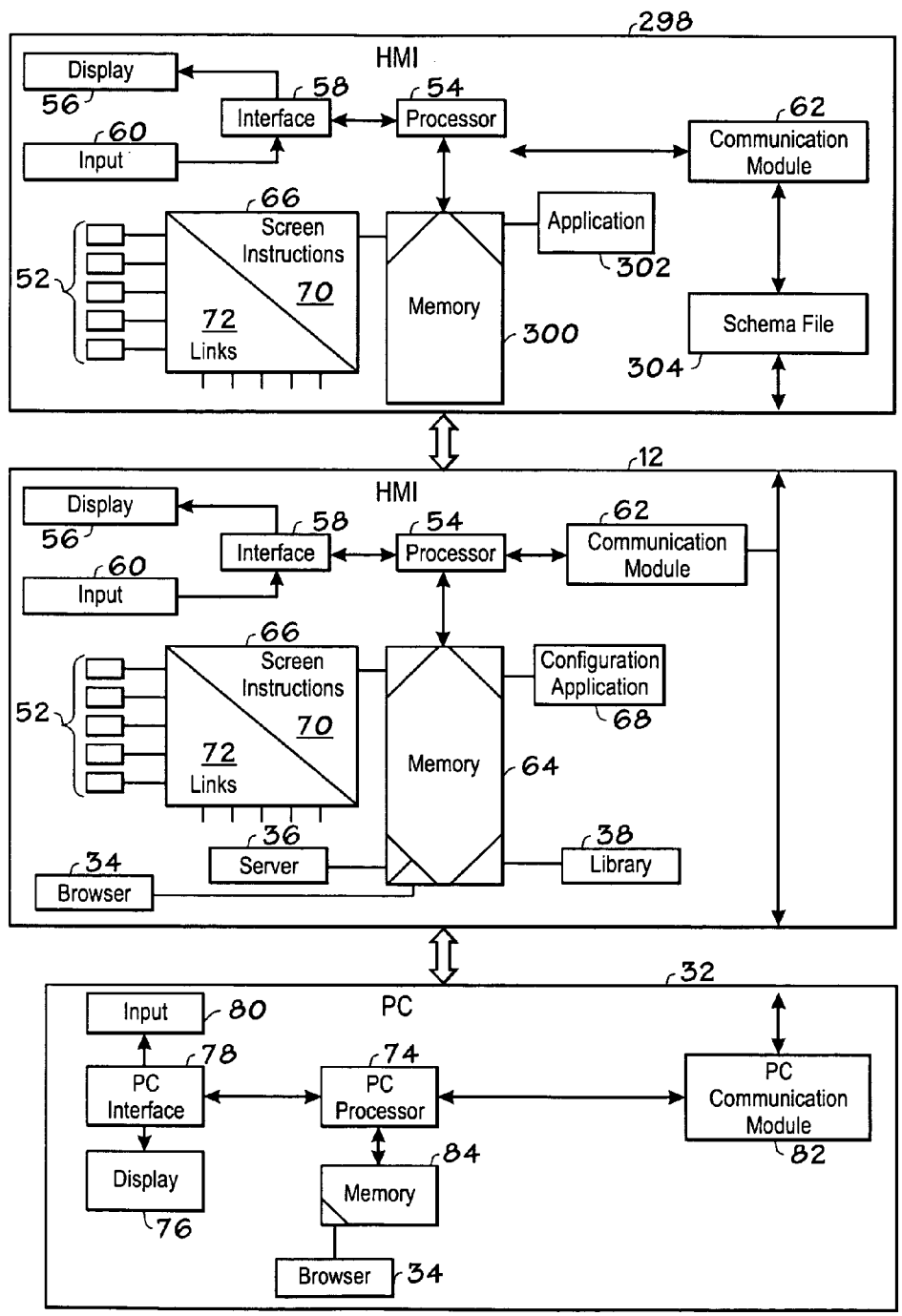
FIG. 14 is a diagrammatical representation of a system for configuration of devices, including a configuration station designed to permit reconfiguration or programming of a device that is not equipped to serve representations of enumerated objects or other configuration data.

As noted above, where the HMI is provided with a design time environment and server software, these components permit enumeration of objects defining viewable screens and interface pages, as well as programming for calculating values, and performing other functions in the HMI. However, certain devices may not be provided with such functionality, but are still programmable in accordance with the present techniques. FIG. 14 is a diagrammatical overview of one exemplary approach for programming such devices.

The non-server enabled device, indicated generally by reference numeral 298, may include many of the same components described above. Thus, the device includes a processor 54 coupled to an interface 58 that itself may receive input 60 and drive a display 56. It should be noted that, although the device in FIG. 14 is labeled as an "HMI", and non-server enabled HMI's may certainly be programmed as set forth below, this aspect of the present technique is in no way limited to programming of HMI's. Rather, any suitable device may be programmed or configured in this manner, including, sensors, actuators, switching devices, such as relays and contactors, to mention only a few. However, because the device 298 is not designed to store and execute a design time environment, nor is it equipped with server software, the memory circuitry is denoted by reference numeral 300, to demonstrate these differences. At the same time, the device 298 is provided with an application 302 which permits its configuration to be accessed and stored in a file that is descriptive of this configuration. The application may include objects that enumerate properties of the programmed objects with device 298 in accordance with enumeration steps described above. The application 302 is thus designed to create a file which summarizes properties of objects within the device 298, particularly objects that relate to user-viewable screens and pages that can be displayed on the device 298.

Application 302 may generate any suitable type of file descriptive of the configuration of the device. However, in a present embodiment, the application would create a schema file, as indicated by reference numeral 304 in FIG. 14. As will be appreciated by those skilled in the art, such files may be created in various formats and in conformance with various software programs. An exemplary schema file 304 used to summarize the configuration of device 298 may be configured as an extensible markup language (XML) file. Those skilled in the art will recognize that schema files in an XML format conform to a general-purpose markup language standard capable of describing different types of data. The schema file may provide various types of information regarding the configuration of the device 298, including the objects, their identification, properties available for configuration, node addresses in a network (e.g., for connections), ranges of properties, and visual representations for objects having such representation in a user-viewable page. Moreover, information may list parameters which must be configured, as opposed to, and an addition to parameters which can be configured. Moreover, the schema file may also include help text or tips aiding a programmer in configuring the device as described below. In effect, the schema file may define, within device 298, a "proxy object" which can be transmitted to a separate HMI 12 for a configuration of device 298.

The HMI 12 is essentially identical to the HMI described above, and functions in a similar manner for configuration of its own parameters, as well as for configuring device 298. In practice, a link is established between the two devices, and HMI 12 effectively "discovers" HMI device on a network, to establish a partnership between the two devices. The HMI 12 will then upload the schema file 304 from device 298. The configuration procedures provided within HMI 12, summarized above, permit external devices to be shown and certain of their properties to be enumerated. In the present context, then, the device 298, via its schema file, would be represented in such manner, such that the properties summarized in the schema file can be enumerated and served to a configuration station 32 in a manner similar to that described above.

Figure 15:
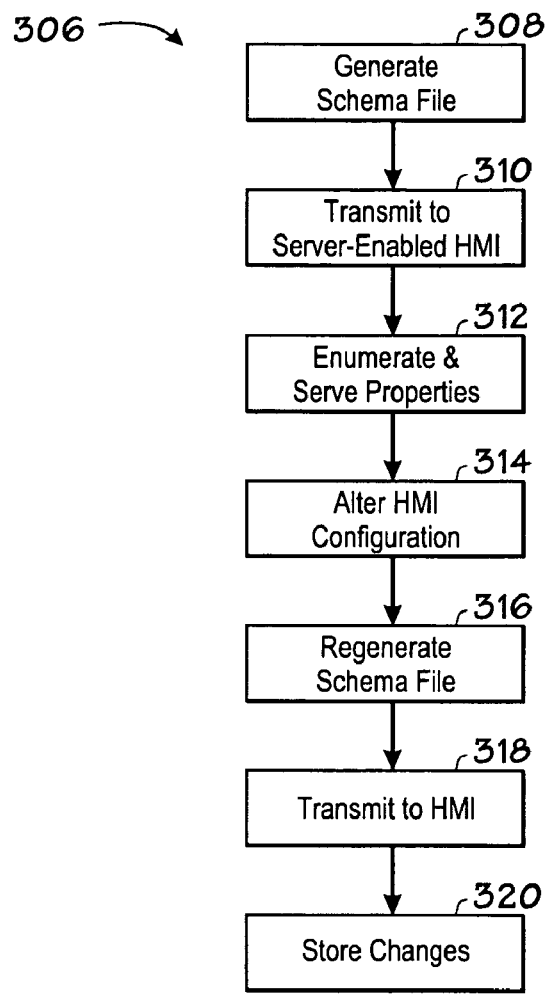
FIG. 15 is a flow chart illustrating exemplary logic in configuration of a non-server enabled device of the type shown in FIG. 14.

FIG. 15 summarizes exemplary steps in logic for programming a non-server enabled device via a server-enabled HMI. The logic, indicated generally be reference numeral 306, begins at step 308 where the schema file is generated. Again, it should be noted that while reference is made at the flow chart of FIG. 15 to a schema file, any suitable file format capable of capturing the configuration of the device to be configured may be employed. The schema file is then transmitted to the server-enabled HMI as indicated at step 310. Again, as noted above, this is possible by virtue of a partnership between the devices in a present embodiment. The properties are then enumerated and representations of the properties are served to a configuration station as summarized in step 312. The exemplary present embodiment performs such tasks by means of the procedures described above. The device configuration may then be altered by a user operating in a browser of a configuration station, as indicated by reference numeral 314 in FIG. 15.

In effect, the technique may allow for accepting "on-the-fly" information from the device to be configured, and storing this information within the device capable of serving the information to a configuration station. A configuration file is created in the server-enabled HMI and resent to the originating device, such as by clicking on a representation of a proxy object in a user-viewable screen of a configuration station. This reconfiguration can also update the visualization provided on the configuration station, and ultimately, where appropriate, changes the visualization of objects in the views served by the re-configured device, where provided. The process could also be carried out when the non-server enabled HMI is not currently connected to the enabled HMI. The schema file could be stored in the enabled HMI which could use a generic proxy object to enumerate and change the configuration, which could be re-sent either contemporaneously or after re-configuration when the two devices are reconnected.

Returning to FIG. 15, following alteration of the device configuration at step 14, then, a schema file is regenerated in the server-enabled HMI, as indicated at step 316. This re-configuration file is then re-transmitted to the original HMI as indicated at 318. These configuration changes are then stored and take effect in the non-server-enabled device as indicated at step 320.

Figure 16:
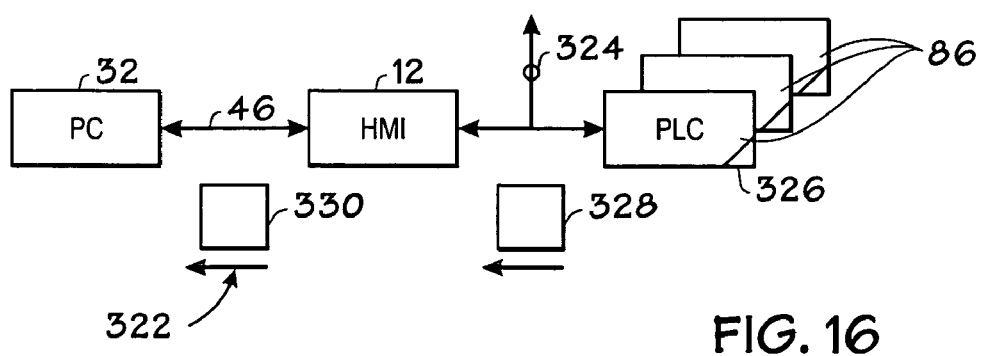
FIG. 16 is diagrammatical representation of an arrangement for accessing tags or link information from controllers for programming an HMI.

FIG. 16 is a diagrammatical representation of a technique for programming an HMI with connections or addresses acquired from one or more controllers. In particular, the arrangement, designated generally by reference numeral 322 includes an HMI 12 coupled to a configuration station 32 as described above. The HMI is also coupled to one or more controllers 86, such as programmable logic controllers. In general, as will be appreciated by those skilled in the art, interfaces may be coupled to such controllers, and indeed the controllers may be coupled to one another and to remote equipment by means of a network as indicated by reference numeral 324. Such networks may use standard communications protocols, such as DeviceNet. The protocols allow for the exchange of data between the HMI 12 and the controllers 86. As noted above, each controller will typically include a series of memory addresses or registers in which data may be stored. The data may be acquired from sensors or other components, including other controllers and from HMI 12. Moreover, the registers may be read by the HMI and the data used for display of parameters for a user viewing a page displayable on the HMI as described above. Moreover, the HMI 12 may perform calculations based upon the data read from one or more registers. The registers are generally designated in FIG. 16 by the reference numeral 326.

In the implementation of FIG. 16, then, HMI 12 may be coupled to the controllers via the network 324 and to the configuration station 32. The HMI can access data descriptive of the registers and their identification as indicated generally at reference numeral 328 in FIG. 16. As will be appreciated by those skilled in the art, such data may be provided in a "tag database" in which registers or connections are tagged by their register address and an identifying name. As will also be appreciated by those skilled in the art, access to such tag databases is generally limited to devices that are able to determine where in the controller the information is stored and how to access the information. In a presently contemplated embodiment, this may serve as a mechanism for insuring proper compatibility and quality control in interfacing the HMI 12 and controllers 86, as well as in the configuration of HMI 12.

Once the information is accessed from one or more controllers 86, the HMI 12 will be configured to compile a table or other presentation of the connections. In the presently contemplated embodiment, for example, Java script stored in the HMI 12 can be configured to tabulate the connections in a table shell that is populated with accessed data. An HTML page or portion of a page can be built by the Java script, such as from metadata configured in accordance with an extensible markup language protocol. Subsequently, the table is presented to a programmer working at the configuration station 32, as indicated at reference numeral 330 in FIG. 16. The table may be presented during a configuration session in which properties of the HMI are configured as discussed above. Selection of one or more connections from the tabulated view, then, can serve to program one or more properties of one or more objects within the HMI, to establish a connection for reading or writing from one or more registers from one or more controllers.

Figures 17, 18:
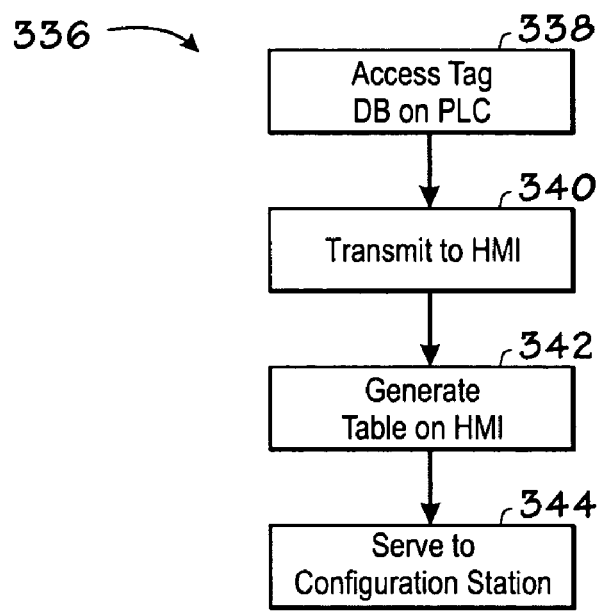
FIG. 17 is an exemplary address list for variables accessible from a controller and used in programming an HMI.
FIG. 18 is a flow chart illustrating exemplary logic in programming an HMI to address certain registers based on information acquired from networked controllers.

FIG. 17 illustrates an exemplary table that may be served by the HMI 12 to a configuration station. The table, again designated by reference numeral 330, may include a series of names given to various parameters stored within specific registers, as indicated by reference numeral 332. Register addresses will be listed for each of these variables as indicated by reference numeral 334. As will be appreciated by those skilled in the art, the names can be assigned to provide a "plain language" reference for the variables to be accessed from or written to the registers. The register addresses themselves will typically be a series of alphanumeric characters that designate the specific register to be written to or read from.

FIG. 18 illustrates generally certain steps in exemplary logic for carrying out the connection access and configuration process. The process, generally indicated by reference numeral 336, begins with accessing a tag database or other similar information from a controller, as indicated at step 338. Again, the HMI 12 will typically be programmed to identify the type or make of the controller, and thereby where and how to access the tagged database. The data is then transmitted from the controller to the HMI as indicate at step 340. At step 342, the HMI compiles a table or other view listing the register names and addresses to be served to the configuration station in accordance with the processes described above. At step 344, then, the tabulated information is served to the configuration station. Subsequent steps, as noted above, will include programming of the HMI based upon selection of one or more registers from the list, and these steps will generally follow the processes for programming the HMI discussed in detail above.

Figure 19:
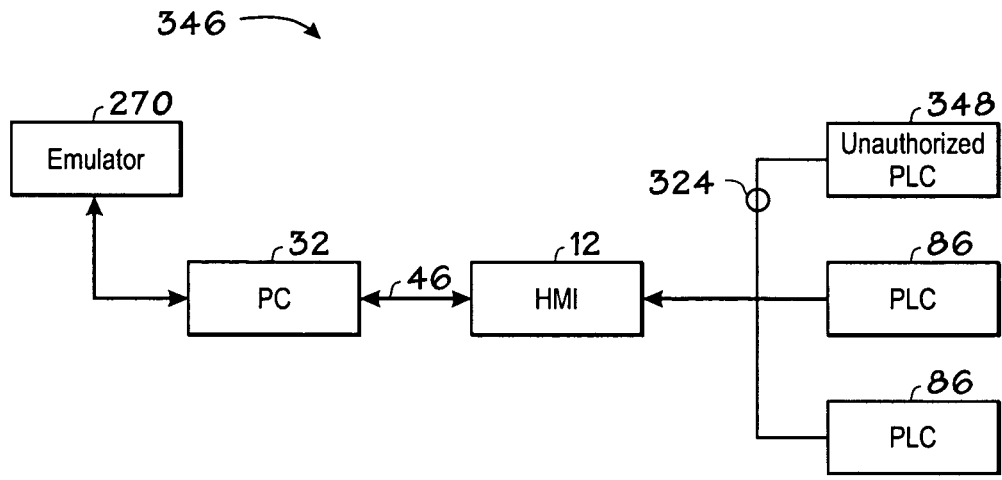
FIG. 19 is a diagrammatical representation of a system in which an HMI is programmed, the HMI being coupled to at least one unauthorized controller.

The present technique also provides for some control of quality and programming of the HMI that is based upon recognition or non-recognition of certain controllers or other devices. In particular, as summarized in the diagrammatical view of FIG. 19, unrecognized, unauthorized, or unapproved controllers may limit the configurability of the HMI based upon information from such controllers. In the arrangement summarized in FIG. 19, designated generally by reference numeral 346, an HMI 12 of the type described above is again coupled to a configuration station 32. The configuration station 32 is, in turn, coupled to or includes an emulator 270 as described above. Basically, the emulator may reside remotely of the configuration station and be accessed by a network connection. The emulator consists of software that serves as a development tool for programming HMI's. The emulator may, for example, provide a view of an HMI that is essentially identical to that of the actual HMI 12, including the display area and interface buttons, switches, and so forth.

In the arrangement of FIG. 19, the HMI 12 is again coupled to a series of controllers 86 or other devices via a network 324. One of the devices, indicated by reference numeral 348, is an unauthorized, unrecognized, or unapproved controller. That is, the HMI 12 is not specifically equipped to interface with the controller, or the controller has not been approved for use with the HMI 12. In such situations, programming of the HMI 12 could be hampered by the inability accurately to detect registers within the controller, programming of the controller, or any other features of the controller required for accurate configuration of the HMI. In such situations, the development environment served by the HMI may indicate this fact, and limit the ability to configure the HMI via the configuration station 32.

Several scenarios may be envisaged to provide this quality control. In a first, the HMI may cause a message to be returned to the user on the configuration station 32, indicating that the emulator 270 must be used, as opposed to direct connection to the HMI 12, for configuration. Moreover, a message from the HMI to the configuration station may also be displayed indicating that the configuration station must be directly connected to the controller for programming. Still further, a similar message may indicate that the HMI cannot be programmed to function with the unauthorized or unrecognized controller.

Figure 20:
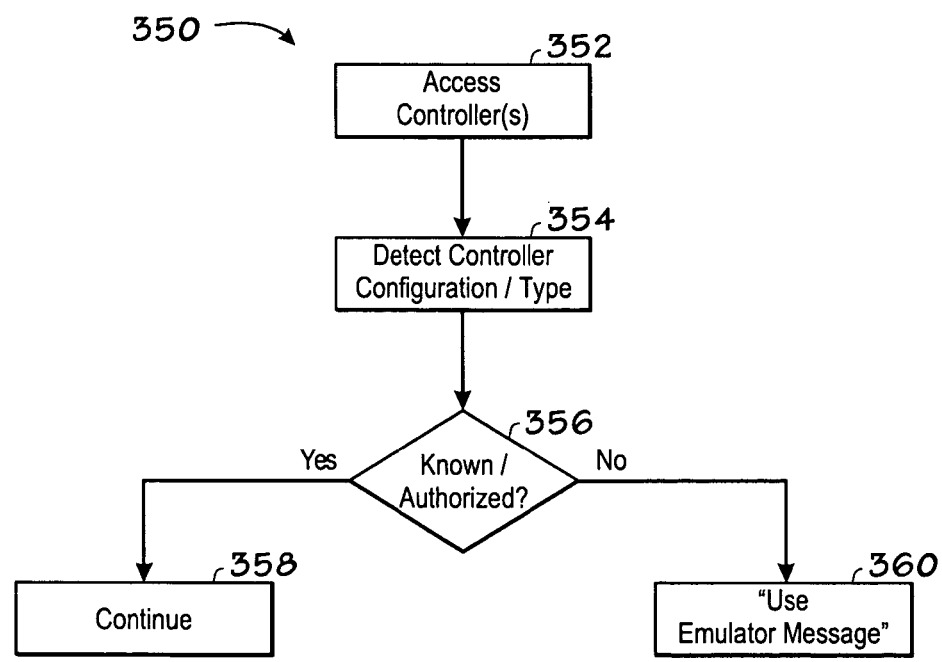
FIG. 20 is a flow chart illustrating exemplary logic in limiting programmability of an HMI in an arrangement of the type shown in FIG. 19 when an unauthorized controller is detected.

The first of these scenarios is summarized generally in FIG. 20, in a process designated generally by reference numeral 350. As noted above, the process begins with accessing data, or attempting to access data from one or more controllers by the HMI 12, as indicated by step 352. The HMI 12 will then detect the controller configuration or controller type as indicated by reference numeral 354. This detection will either recognize that certain controllers or other connected components are recognized or authorized or that they are not. At step 356, then, the HMI determines whether the component is known and authorized to serve as the basis for programming of the HMI. If the controller or other device is known and authorized, the programming will continue as indicated at step 358, along the lines described in detail above. On the other hand, if the device is either unknown, unauthorized or otherwise incompatible with HMI programming, a message is returned to the configuration station 32 as indicated at step 360. In the process illustrated, for example, a message is returned to the programmer indicating that the emulator 270 must be used rather than direct programming on the HMI itself.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for configuring a human machine interface (HMI) comprising:
   coupling the HMI to a controller;
   coupling the HMI to a configuration station;
   accessing data representative of connections from the controller via the HMI and generating a listing of the connections on the HMI;
   enumerating an object programmed on the HMI;
   serving a representation of a property of the enumerated object from the HMI to the configuration station and the listing in a format for viewing in a browser application of the configuration station; and
   altering the property on the configuration station based upon the connections to establish a selected connection between the HMI and the controller, wherein the property is altered to cause the HMI to read data from or write data to the selected connection.

2. The method of claim 1, wherein the connections include identification of registers on the controller for accessing data.

3. The method of claim 1, wherein the connections include identification of registers on the controller for writing data.

4. The method of claim 1, wherein the HMI is coupled to the controller via a network link.

5. The method of claim 1, wherein the listing is generated in an extensible markup language.

6. A method for configuring a human machine interface (HMI) comprising:
   coupling the HMI to a controller;
   coupling the HMI to a configuration station;
   accessing data representative of connections from the controller via the HMI;
   enumerating an object programmed on the HMI;
   serving a representation of a property of the enumerated object from the HMI to the configuration station;
   generating a listing of the connections in the HMI;
   serving the listing from the HMI to the configuration station in a format for viewing in a browser application of the configuration station; and
   receiving from the configuration station an alteration of the property based upon the connections to establish a selected connection between the HMI and the controller to cause the HMI to read data from or write data to the selected connection.

7. The method of claim 6, wherein the connections include identification of registers on the controller for accessing data.

8. The method of claim 6, wherein the connections include identification of registers on the controller for writing data.

9. A system for configuring a human machine interface (HMI) comprising:
   an HMI configured to be coupled to a controller and to a configuration station, the HMI being configured to access data representative of connections from the controller and to enumerate an object programmed on the HMI, the HMI comprising a server for serving a representation of a property of the enumerated object from the HMI to the configuration station, the HMI being further configured to generate a listing of the connections and to serve the listing from the HMI to the configuration station in a format for viewing in a browser application; wherein the HMI is further configured to receive a change in the property from the configuration station to establish a connection selected from the listing therefrom defining a register in the controller from which the HMI reads data or to which the HMI writes data, and to alter the object based upon the received change.

10. The system of claim 9, wherein the HMI is configured to serve a design-time environment to the configuration station permitting changes to the property of the object.

* * * * *